US006522418B2

(12) United States Patent
Yokomizo et al.

(10) Patent No.: US 6,522,418 B2
(45) Date of Patent: *Feb. 18, 2003

(54) METHOD OF AND SYSTEM FOR EDITING IMAGES

(75) Inventors: Yoshikazu Yokomizo, Yokohama (JP); Yasuhiro Watanabe, Yokohama (JP); Koichi Matsumura, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/076,631

(22) Filed: May 12, 1998

(65) Prior Publication Data

US 2002/0067500 A1 Jun. 6, 2002

(51) Int. Cl.⁷ ............................................. H04N 1/46
(52) U.S. Cl. ...................................... 358/1.15; 382/162
(58) Field of Search ............................... 358/1.15, 527; 382/112, 162, 309

(56) References Cited

U.S. PATENT DOCUMENTS

| | | | |
|---|---|---|---|
| 5,327,265 A | 7/1994 | McDonald | 358/527 |
| 5,384,835 A | 1/1995 | Wheeler et al. | 379/96 |
| 5,666,215 A | 9/1997 | Fredlund et al. | 358/487 |
| 5,838,685 A | * 11/1998 | Hochman | 370/428 |

FOREIGN PATENT DOCUMENTS

| | | |
|---|---|---|
| EP | 0 559 376 A1 | 9/1993 |
| EP | 0 753 852 A1 | 1/1997 |
| EP | 0 767 575 A2 | 4/1997 |
| GB | 2 286 944 A | 8/1995 |
| GB | 2 300 991 A | 11/1996 |

* cited by examiner

Primary Examiner—Thomas D. Lee
Assistant Examiner—Stephen Brinich
(74) Attorney, Agent, or Firm—Fitzpatrick, Cella, Harper & Scinto

(57) ABSTRACT

An image processing method employs a system having a remote image processing station and a server image processing station. The method has the following steps: a first storage step in which high-resolution information is stored in the remote image processing station; a first transferring step in which image information of resolution lower than that of the high-resolution image information is transferred from the remote image processing station to the server image processing station; a second storage step in which the low-resolution image information transferred in the first transferring step is stored in the server image processing station; a second transferring step in which the low-resolution image information stored in the second storage step is transferred from the server image processing station to a user's terminal; a first editing step in which the low-resolution image information transferred in the second transferring step is edited at the user's terminal; a third transferring step in which editorial information indicative of the contents of the edition performed in the first editing step is transferred from the user's terminal to the remote image processing station; and a second editing step in which the high-resolution image information stored in the first storage step is edited in the remote image processing station in accordance with the editorial information transferred in the third transferring step.

12 Claims, 11 Drawing Sheets

METHOD OF AND SYSTEM FOR EDITING IMAGES

BACKGROUND OF THE INVENTION

1. Field of the Invention

The present invention relates to an image editing method, as well as to an image editing system, which processes through a network various digital images such as digitized photographs, for the purpose of transmission, display, edition, printing and so forth, in compliance with orders given by customers.

2. Description of the Related Art

Conventionally, users of cameras bring the films after exposure to so-called laboratory-shops, where photographic processings are executed, such as development and printing, to produce photographs in accordance with the camera user's requests. Although the user's requests are accepted to some extent in regard to print size, trimming and so forth, there are as a practical matter limitations on the range of selections open to the user.

On the other hand, from the standpoint of the camera user, it is quite troublesome and inconvenient to visit laboratory-shops each time he or she wishes to have desired photographic outputs. In order to obviate this problem, it is conceivable that silver salt photographs are digitized into digital images and sent through a network for processing.

This gives rise to a venture to setup a new business in which silver salt photographs, which are nowadays very popular, are digitized for processing and delivery through a network. Such a venture, however, does not seem likely to be successful from a commercial point of view. This is because the processing and delivery through the network will raise the fees for the services to a level that cannot easily be accepted by a household economy, due to the large amount amount of the digital data to be transmitted through the network.

For the purpose of sending full-color images, it is possible to use the JPEG compression technique, which is a popular non-reciprocal compression method. Even when such a compression technique is used, however, the problem remains that, while the communication time is in inverse proportion to the communication capacity of the network, the fees are raised in proportion to the communication capacity, although the quality of the image is improved as the communication capacity increases. Thus, it is not easy to obtain a good balance of these three factors: (1) communication fees, (2) communication time, and (3) image quality.

The Internet (referred to also as "WWW", hereinafter), which is now spreading widely and rapidly, employs a description language HTML as a format for expressing images. Such images are transmitted via the Internet by means of a communication protocol known as HTTP. This transmission method, however, does not allow easy editing of images and text, although it is suitably employed in transmission/display of texts accompanied by still images. Therefore, it is not appropriate to use ordinary WWW communication protocol for the purpose of transmission, when it is desired to edit transmitted texts and images.

It might be possible to employ a specific transmission method capable of eliminating the above-described problems or shortcomings. Such a specific transmission method, however, will deprive users of the advantages of the WWW, which can readily be accessed and used by ordinary persons all over the world.

SUMMARY OF THE INVENTION

It is a primary object of the present invention to obviate the above-described problems and shortcomings.

Accordingly, it is an object of the present invention to make available a service in which silver-salt photographic pictures or images are transmitted, displayed, edited and printed at practically acceptable fees, by using communication lines such as telephone lines or ISDN lines which can easily be afforded by individual households.

It is another object of the present invention to provide a method which enables interactive image edition through the WWW, without requiring any significant modification of the WWW.

It is a further object of the present invention to provide an image editing method which employs templates suitable for execution of the editorial work, thus enabling practical storage service with reduced occupation of storage area in the storage medium.

To these ends, according to one aspect of the present invention, there is provided an image processing method for processing an image in a system having a remote image processing station and a server image processing station, comprising: a first storage step in which high-resolution information is stored in the remote image processing station; a first transferring step in which image information of resolution lower than that of the high-resolution image information is transferred from the remote image processing station to the server image processing station; a second storage step in which the low-resolution image information transferred in the first transferring step is stored in the server image processing station; a second transferring step in which the low-resolution image information stored in the second storage step is transferred from the server image processing station to a user's terminal; a first editing step in which the low-resolution image information transferred in the second transferring step is edited at the user's terminal; a third transferring step in which editorial information indicative of the contents of the edition performed in the first editing step is transferred from the user's terminal to the remote image processing station; and a second editing step in which the high-resolution image information stored in the first storage step is edited in the remote image processing station in accordance with the editorial information transferred in the third transferring step.

According to another aspect of the present invention, there is provided an image processing system comprising a remote image processing station and a server image processing station, wherein the remote image processing station comprises: first storage means for storing high-resolution information; first transferring means for transferring low-resolution image information of resolution lower than that of the high-resolution image information to the server image processing station; first receiving means for receiving, from the server image processing station, editorial information indicative of the contents of edition which has been effected on the low-resolution image information; and editing means for editing the high-resolution image information stored in the first storage means in accordance with the editorial information received by the first receiving means; and wherein the server image processing station comprises: second storage means for storing the low-resolution image information transferred by the first transferring means; second transferring means for transferring the low-resolution image information stored in the second storage means to a user's terminal; second receiving means for receiving the editorial information indicative of the contents of the edition performed on the low-resolution image at the user's terminal; and third transferring means for transferring the editorial information received by the second receiving means to the remote image processing station.

These and other objects, features and advantages of the present invention will become clear from the following description when the same is read in conjunction with the accompanying drawings.

DESCRIPTION OF THE PREFERRED EMBODIMENTS

Figure 1:
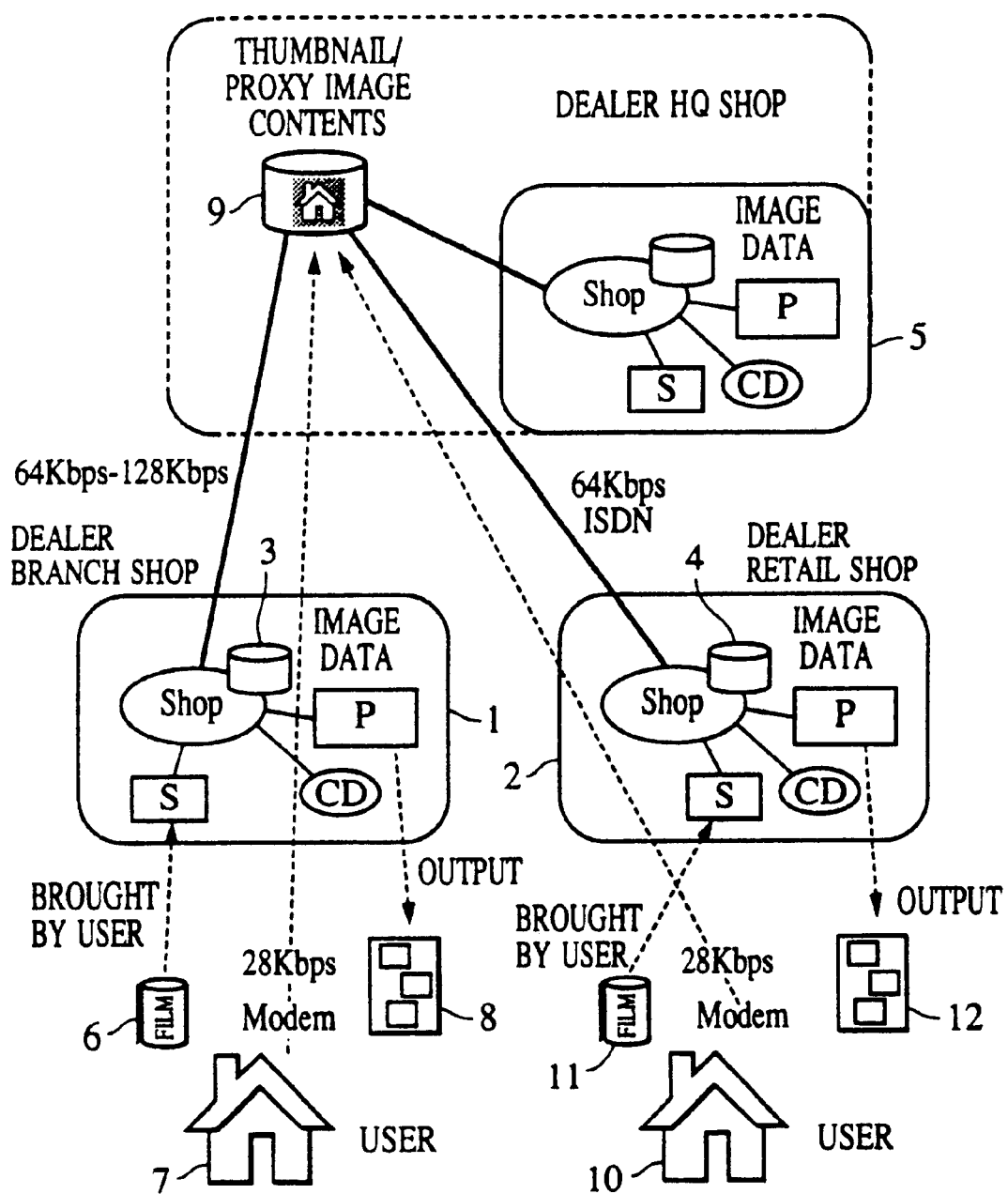
FIG. 1 is diagrammatic illustration of the structure of whole image editing system in accordance with one embodiment of the present invention.

A description will be given of the flow of a practical image processing performed by an embodiment of the present invention having a system architecture as shown in FIG. 1.

A user 7 brings a photographic film 6 after exposure to a dealer branch shop 1. Similarly, a photographic film 11 after exposure is brought by a user 10 to a dealer retail shop 2. The films 6, 11 are subjected to an ordinary silver-salt photographic developing process in the shops 1, 2. In each shop, the developed photographic image is converted into a digital image, i.e., digital data, which is then stored in a hard disk 3, 4 serving as a large-capacity storage device. The shop personnel or the user himself can effect various editorial work on the image data by using an editing table provided in the shop, in order to obtain any desired edited picture. For instance, a desktop computer may be used as the editing desk.

Editorial functions available in this embodiment include, for example, changing into a photograph of a tone like an oil painting or a watercolor picture, selectable by clicking corresponding buttons. Other kinds of processing are also available, such as sharpening of a defocus photographic picture, red-eye processing for removing the red-eye effect (change into black eye picture), and so forth. Any and all types of editorial functions can be implemented in this embodiment.

This embodiment permits not only editorial work on a single image but also editorial work for assembling a plurality of images into an "album". High-grade albums equivalent to those edited by professionals can be obtained simply by inserting the user's images into templates which have been formed beforehand with attractive pictorial designs.

Each template is a document file part of which has already been edited, and has a file architecture with text slots and photo-slots into which texts and images can freely be inserted. The user can effect additional editing on the partly-edited document file, i.e., the template, so as to complete a target image in accordance with his taste. Insertion of the images can be inserted into the photo-slot by, for example, a drag-and-drop operation.

The images thus finally edited are printed by means of printers P, the results 8,12 of which are delivered to the users. There is no substantial difference between the dealer HQ shop 5 and the branch and retail shops 1, 2, in regard to the described series of processes and services. Thus, the user who has brought an exposed film to the dealer HQ shop 5 can enjoy the same services as those offered to the users 7, 10 who have contacted the shops 1, 2.

The sole difference between the HQ shop 5 and the branch and retail shops 1, 2 is that the latter lack a web server 9 which is installed in the former. Although such a web server may be installed in the branch shop 1 or the retail shop 2 from a technical point of view, the following description proceeds on the assumption that the web server 9 is installed in the HQ shop 5, by way of example, as such an arrangement is considered to be a standard one.

Conventional silver-salt photograph processing services employ a base laboratory. Undeveloped exposed films and negative films received at many retail shops are physically sent to and gathered at the base laboratory, where the requested processing such as development and printing are executed. The resultant product photographs are then sent to the retail shops. There is also a conventional system which consists of mini-laboratories each of which receives undeveloped films and negative films and conducts development and printing by themselves. In this embodiment, each dealer branch shop and retail shop offers processing services similar to those offered by the mini-laboratories of the conventional systems.

Exchange of Information Between HQ Shop and Branch Shop

As has been described, in this embodiment, all necessary editorial processings can be dealt with in each dealer branch shop. This embodiment further enables, besides the ordinal image output services described above, a specific service referred to as "proxy image editorial processing" which permits each user to effect editorial processing directly from his home through a network. Detail of the proxy image editorial processing will be described later.

A facility for such proxy image editorial processing may employ computer systems installed both in the branch shop 1 and the retail shop 2. Such a facility, however, requires a considerable investment and, hence, is not practical. In this embodiment, therefore, a sole web server 9 is installed in the HQ shop 5, and the branch shop 1 and the retail shop 2 are connected to this web server 9 through communication lines.

Thus, when the branch shop 1 or the retail shop 2 offers a proxy image editorial service to a customer, network communication is performed between the shop 1,2 and the head shop 5 in a manner described hereinunder.

As stated above, from an economic point of view, it is not good policy to install a web server in each of the branch shop 1 and the retail shop 2. For instance, in the case of a franchise or chain-developed business entity having a HQ shop and many other branch and retail shops, it suffices that a sole web server is installed in the HQ shop. Although a web server may reasonably be set up by using a personal computer (PC), such a PC is usually not designed to deal with all possible occurrences and, hence, cannot provide a highly reliable system with minimized risk of the system going down. Thus, a "reasonable" web server may result in an "unreasonable" system. In this embodiment, therefore, only the HQ shop 5 is equipped with the web server 9, which in turn can be connected to the shops 1, 2 through exclusive lines, as well as through dial-up lines such as ISDN.

Various network services are available for the interconnection between the shops 1,2 and the web server 9. The services which are intended in this embodiment includes, for example, the following basic service.

It is recalled that the user 7 has brought the film 6 to the dealer branch shop 1. The dealer branch shop develops the photograph and scans the same to form a digitized image, which in turn is uploaded to the web server 9.

The uploaded digital image is accessible from the user's home through a terminal such as a PC via the WWW in 2 or 3 hours after the order at the shop 1. Thus, the user can observe the photographic image through the PC and can select any desired image for editing and printing.

The described service essentially requires that each shop 1,2 reads the user's photograph by a scanner and the image thus read is sent from, for example, the shop 1 to the web server 9 of the HQ shop 5 through the network shown in FIG. 1. At the same time, in order that the user can observe and edit the image of the photograph taken by the user, it is necessary that the user makes access to the web server 9 and retrieves the image of interest to download it to the user's terminal. Data transmission lines of high data transmission rate are not available for most of individual users: probably low data rate lines of 28 Kbps would be used practically.

In view of these background considerations, the described embodiment of the invention may employ the following arrangement.

For instance, the scanner S at the shop 1 scans the original photographic image to form a high-resolution image information of, for example, 2048×3072 dots per frame. This high-resolution image information is stored in a disk 3 at the branch shop 1. At the same time, image information such as a proxy image, having a resolution lower than that of the aforesaid high-resolution image information, e.g., 256×384 dots per frame, is formed out of the high-resolution image data. The low-resolution image information thus obtained, e.g., a proxy image, also is stored in the disk 3 at the shop 1, while being linked with the high-resolution image information.

Meanwhile, the low-resolution image information alone, formed from the high-resolution image information, is uploaded in the web server 9 at the head shop 5. If necessary, an image of a further reduced resolution, e.g., a thumbnail image, may be used instead of the low-resolution image. Upon receipt of a request from the user 7 for sending the stored image, the web server 9 at the HQ shop 5 sends the low-resolution image information to the user 7 through the network. The user then effects the desired editorial work on the low-resolution image information thus received by the personal computer of the user's own.

Upon completion of the necessary editorial processing on the downloaded image, the user 7 sends only the editorial information, e.g., editorial commands or instructions to be applied to the image, to the web server 9 through the network. The HQ shop 5 then sends the editorial information to the branch shop 1 through the network.

Upon receipt of the editorial information from the HQ shop 1, the branch shop 1 executes editorial processing on the high-resolution image which has been stored in the disk 3. The high-resolution image information after the editorial processing is then outputted through, for example, the printer P and delivered to the user.

Thus, in the described embodiment of the present invention, the image information sent from the branch shop to the HQ shop and the image information downloaded from the HQ shop web server to the user's PC are of the low resolution. The user does not send the edited image but sends only the editorial commands or instructions, i.e., editorial data, to the HQ shop. Similarly, only the editorial information is sent from the HQ shop to the branch shop.

The branch shop retrieves the stored data to find the high-resolution image information corresponding to the received editorial data, and executes the editorial processing on the high-resolution image information in accordance with the received editorial data. It it thus possible to implement a system with minimized traffic on the network.

Features of the System of the Invention

The described system embodying the invention is equivalent to the conventional mini-laboratory system which employ a number of mini-laboratories or shops, insofar as it is required to comply with various specific editorial requests. However, if it complies with such requests, the system may be referred to as, for example, a hybrid system in which the two types of conventional systems, i.e., the base laboratory system and the mini-laboratory system are suitably combined.

It is to be understood that the mini-laboratory system offers the following advantages over the base laboratory system.

(1) Mini-laboratories as a whole have a total processing capacity greater than that of the base laboratory system. A single server, however high it may be in speed and large in capacity, cannot compete with numerous mini-laboratories distributed over the whole country, as is well demonstrated by the history of computer down-sizing.

(2) It is reasonable that only the low-resolution proxy images or thumbnail images are uploaded in the web server, considering that the transmission of high-resolution image of large data size is quite time-consuming.

(3) A sense of security is given to the owner of the mini-laboratory shop, as well as to the user, since the image of the user's photograph is stored in the system of the shop visited by the user. For the same reason, the shop owner can offer a diversified service at his discretion.

(4) Any accident occurring in the system of one shop does not spread to other shops. Thus, any trouble taking place in the system of one shop does not affect the whole system including the systems of other shops and the system of the head shop. This eliminates the risk of an overall system-down occurrence.

(5) In the base laboratory system composed of a base laboratory and retail shops, the base laboratory has a potential to deprive the shops of their business so that the shops can function merely as film recipients. In contrast, in the described system embodying the present invention, the system installed at the HQ shop supports the business of the branch shops by sharing part of the clients that cannot be dealt with by a given individual shop.

Thus, the described embodiment is advantageous both for the HQ shop and individual branch shops.

In order to enjoy the described service implemented via the web server of the main shop, the user or the client pays additional fee when he deposits his film at the branch shop. The shop then conducts the additional work for reading the developed photograph by a scanner and uploading the read image on the web server 9 of the HQ shop. The branch shops gives an access code to the user who wishes to enjoy this service. The user makes an access to the homepage of the dealer's HQ shop through the internet and inputs the access code which is not known to other persons, so that he can see, through the internet, the photographic image digitized by the branch shop.

In this embodiment, therefore, the image read and digitized from the user's photograph exists both in the dealer branch shop and the server in the HQ shop. The storage device of the dealer branch shop stores the image in the form of "high-resolution information", which is referred to as "16 Base" and which is to be sued in the final printing.

In contrast, the server of the dealer HQ shop stores "low-resolution information" such as thumbnail image or proxy image sent from the branch shop. The image information to be stored in the server of the HQ shop need not be of high resolution, because it is used only for the purpose of observation through personal computers.

Usually, 1/16 Base images are used as the thumbnail images, while Base images are used as the proxy images.

Definition of Images Used in this Embodiment

The image processing process in this embodiment deals with images of the following resolutions.

16 Base image (original high-resolution image): 2048×3072 pixels

4 Base image (medium-resolution image): 1024×1536 pixels

Base image (proxy image): 512×768 pixels

¼ Base image (further low-resolution image): 256×384 pixels

1/16 Base image (thumbnail image): 128×192 pixels

As will be understood from the foregoing description, the system in accordance with the described embodiment enables the user to effect editorial processing on the low-resolution image existing in the web server 9 of the network, and to send through the network only the "editorial information" to the branch shop where the high-resolution image stored therein is processed in accordance with the editorial information. It is thus possible to implement the editorial and printing functions through the network for producing output images of high resolution.

For instance, the user may input through his personal computer an editorial command requesting that the output print be finished in a tone like an oil-painted picture. In this case, only a code composed of several codes and indicative of the oil-paint taste and the file name indicative of the image of interest are sent from the server at the HQ shop to the branch shop. Upon receipt of the code and the file name data, the branch shop reads the high-resolution image identified by the file name data from the disk 3 of this shop and effects the "oil-paint tone" edition on the thus read high-resolution data. The processed image information is then sent to the printer of this shop.

Thus, the service offered by the HQ shop is not of such a kind that would deprive the business of the branch shops but provides an effective backup to the branch shops by sharing part of customers that cannot be dealt with by a given individual branch shop.

The web server 9 of the head shop 5 also offers a contents service. For instance, a database having abundant image data owned by a greeting card company can be presented for use by the users through the network.

A direct access to the database of the greeting company may be possible independently of the described photographic editorial service. Usually, however, the way to access the database of the greeting card company is not the same as that for the access to the dealer HQ shop of the photographic editorial service company. Thus, the user is obliged to learn different ways of accessing databases through different manners of operation. In contrast, the described embodiment of the invention enables the user to access the database of the greeting card company by the same procedure as that for making access to the dealer HQ shop of the photograph editorial business. Thus, a consolidated access protocol is formed to enable the user to make access both to the database of the greeting card company and the HQ shop of the photograph editorial service business.

Basic Processing at Branch Shop

Figure 2:
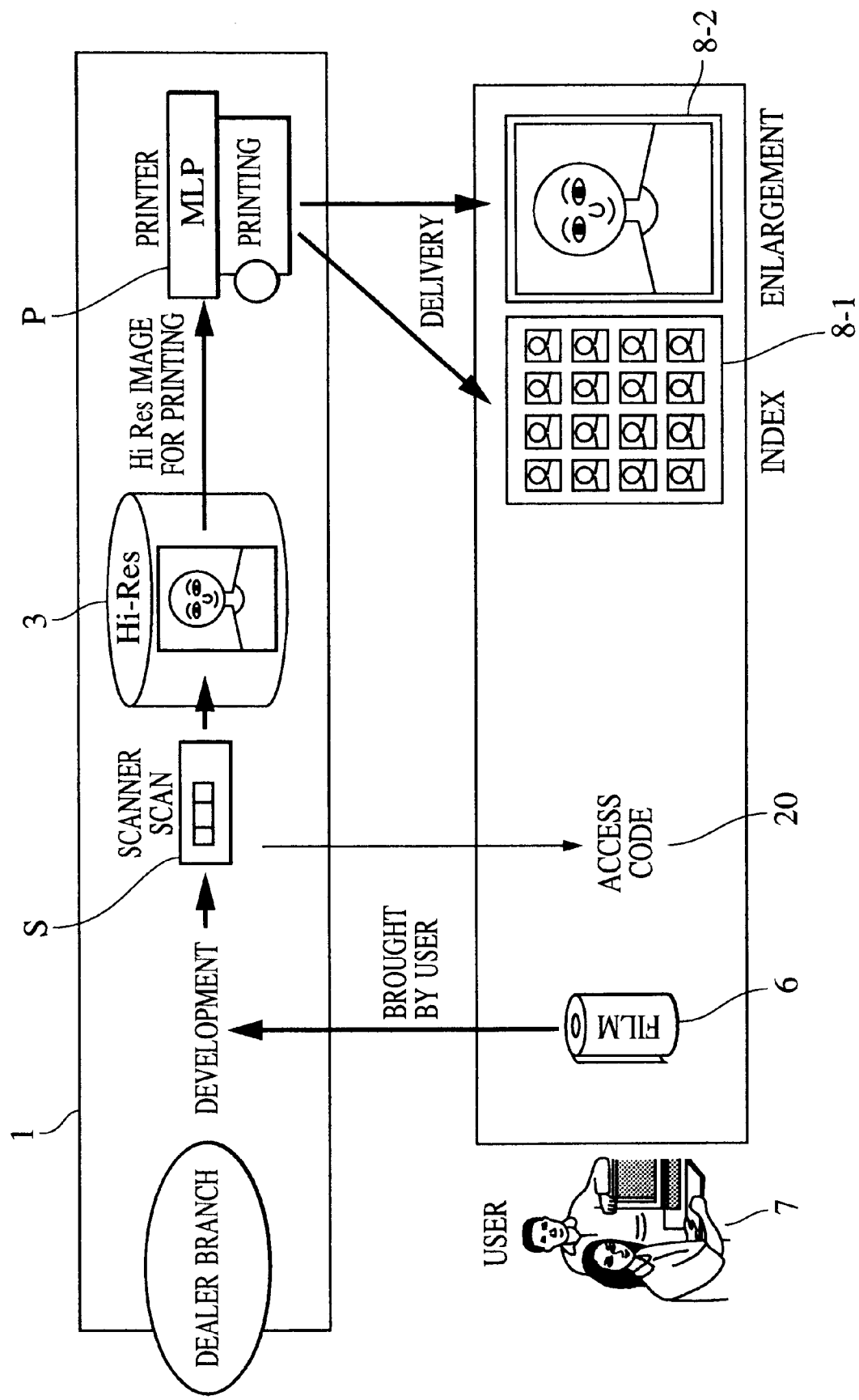
FIG. 2 is a flowchart showing the jobs and routines at a dealer branch shop involved in the embodiment.

A description will now be given of the basic processing executed in the branch shop of the system of this embodiment, with specific reference to FIG. 2, which is a flowchart illustrative of the basic processing flow in the branch shop. In this Figure, the same reference numerals as those used in FIG. 1 are used to denote the same or corresponding parts as those shown in FIG. 1. The direction of the processing flow is from the left to right as viewed on this Figure. That is, the time along a horizontal time axis (not shown) increases from the left to right.

The user 7 has brought an undeveloped film to the branch shop 1 which is a member of the system of the described embodiment. The branch shop is referred to also as a "franchisee". The franchisee develops the images on the film into visible photographs and scans the photographs by means of the scanner S, whereby the read analog image is converted into digital image.

The digital image thus obtained is the original high-resolution image defined in the foregoing description. That is, this digital image is a 16 base image composed of 2048×3072 pixels. This high-resolution image "Hi-Res" is stored in the storage device 3 which is typically a disk-type storage device.

Then, in compliance with the order given by the user, a desired template (not shown) is selected from among the templates which have been stored in, for example, an optical disk (CD) shown in FIG. 1, through the operation of a computer keyboard for example. The template thus selected and fetched is displayed on the display screen under the control of the computer, for the purpose of the editorial processing. The image after the edition is then printed out by means of the printer P.

The printing results thus comply with the user's instruction and may be, for example, an index print 8-1 or an enlarged print 8-2 or else.

The basic processing executed in a branch shop of the system of this embodiment has been described. The series of steps as described are wholly executed in the branch shop. In this sense the described service system may be called a kind of mini-laboratory service system. The user, however, can further enjoy the services which are available through the network. When the user deposits his film at the branch shop, he may request an access code 20 if he wishes to use such services through the network. Such access code, of course, should be kept confidential.

As will be described later, two kinds of access codes may be given to the user when depositing the film to the franchisee. The additional access code also must be kept confidential in order to protect privacy.

Basic Processing Through Network Communication Between the User and the HQ Shop

In the described embodiment of the invention, a service is available to enable the user to directly edit the image through network communication with the HQ shop, besides the services which can be executed by the branch shop itself.

The direct image editorial processing which is available through the network communication between the user and the HQ shop will be described with reference to FIG. 3 which is a flowchart illustrative of such a direct editorial processing.

When digitizing the photographic image developed on the film brought by the user 7, the branch shop forms not only the high-resolution images to be used in the final printing but also a low-resolution proxy images for a monitor display and a thumbnail images of a further reduced resolution. These three types of digital images are stored in the storage device of this branch shop.

A plurality of thumbnail images are displayed on a monitor screen at a time so as to enable the user to quickly find the image of interest. When the user wishes to enjoy the services through the network, the computer of the branch shop 1 automatically sends the proxy images and the thumbnail images to the web server 9 (referred to also as "commerce server", hereinafter).

Upon receipt of the images from the branch shop 1, the commerce server of the dealer HQ shop stores these images in the data base of the HQ shop and, at the same times, automatically registers and opens these images at the Homepage of commerce server. In order to allow such registration/opening of the images, the commerce server automatically generates codes such that a specific line of the homepage written in HTML indicates the received thumbnail images.

At the same time, the low-resolution proxy images are stored in the form of a file under a file name of "Prxy Image. JPEG", while the thumbnail images are stored as a file named "Thumbnail. GIF".

For instance, the following code is generated:
<A HREF="PrxyImge.JPRG">Click to see your Image</A><Br>
<A HREF="PrxyImge.JPEG">IMG SRC="Thumbnail.GIF"></A><Br>

The first line of the code causes a message "Click to See Your Image" to appear on the homepage. The user who is now accessing the homepage clicks this message, so that the image file "PrxyImage.JPEG" is automatically downloaded and displayed on the computer 31 of the user.

The second line of the code enables the user's thumbnail images to be displayed on the homepage. In response to clicking by the user, the image file "PrxyImage.JPEG" is automatically downloaded and displayed on the computer 31 of the user. It is to be understood that the file "PrxyImage-.JPEG" has been formed in accordance with JPEG format, while "Thumbnail.GIF" has been formed in accordance with GIF format.

The user who has acquired access code 20 furnished from the dealer branch shop 1 can make access to the homepage 30 on the web server 9 of the dealer HQ shop 5 from his home through his computer and via the Internet, and can observe and edit his images. Likewise, any friend or family member of the user to whom the user has revealed his access code can make access to the homepage to see the images, even from remote places.

As stated before, it is possible that two types of access codes are given to the user. In such a case, one of the two access codes may be used for opening the images to other persons, while the other access code is for non-opening, i.e., for exclusive use by the user. In this embodiment, the security level for the opening can be controlled by using the non-opening access code. For instance, the following kinds of security levels are prepared and available. "Viewing—Allowed/Not allowed, Printing—Allowed/Not allowed, Editing—Allowed/Not allowed, Erasure—Allowed/Not allowed, Security level control—Allowed/Not allowed"

Preferably, the default setting is made as follows: "Viewing—Allowed/, Printing—Not allowed, Editing—Not allowed, Erasure—Not allowed, Security level control—Not allowed"

It is thus preferred that the control of the security level cannot be effected by using the opening access code alone.

In order to enable edition of the images opened through the internet, it is necessary that a plug-in device exclusive for the commerce server (web server) has been downloaded in advance. Since the results of the editorial processing are expressed in terms of a script (LiveImage+RepairedImage) which is purely editorial command data free of the image data, the file size of editorial results is very small. The format of this script is described in detail in U.S. patent application Ser. No. 09/025,433 filed Feb. 18, 1998 and assigned to the same as the present invention.

Almost all the editorial functions, which can be dealt with by the franchisee of this system, are available for the editorial work from the user's computer. For instance, a wide selection of editorial functions is available, including "insert synthesis" for inserting images in templates, "album edition" 32-1 and even loading of pay images through the use of the contents server are available, in addition to various editorial processings such as "red-eye processing" 32-1, "oil-paint processing", "sepia processing", and so forth.

The user can give an order to the dealer for printing the images, by clicking a "printing instruction button" appearing on the web screen. Consequently, printing is completed at the dealer branch shop by, for example, the day after the day of order. The prints of the images are delivered to the user when the user visits the branch shop. Thus, the user can give any editorial instructions from his home, without taking time and labor to visit the dealer branch shop for the purpose of giving such instructions.

The user may start on his home computer 31 an exclusive application. For instance, the user can download on his computer 31 a function extension unit for commercially available web browser, e.g., Navigator® of Netscape or Internet Explorer of Microsoft.

Plug-in device Navigator, Direct-X and so forth can be used as the function extension unit. In order to enhance the applicability, however, it is preferred to use applets written in Java language.

Each time a command for one of the applets 32-1 to 32-3 is pressed, a command in accordance with HTTP protocol is sent to the Web server 9 so that editorial information 33 can be obtained. The editorial information 33 is composed of a resolution-free page-describing language "PDL" for describing the page and commands including information such as the number of the prints to be produced.

Figure 4:
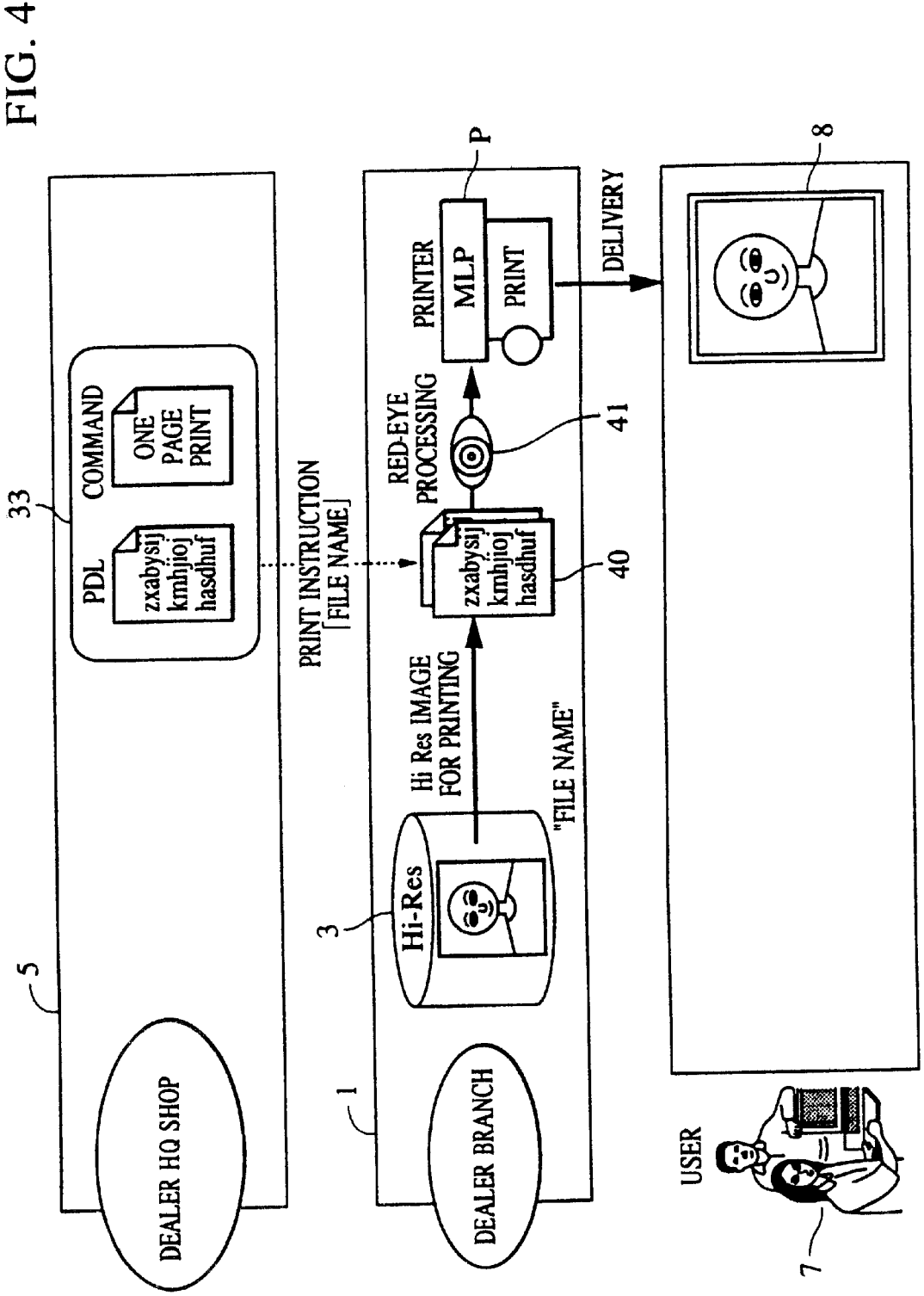
FIG. 4 is a flowchart illustrative of a process in which editorial information of an image after edition is automatically loaded down to a franchisee where the edited image is automatically printed, in accordance with the embodiment of the invention.

FIG. 4 is a flowchart showing the process in which edition and printing of images are automatically performed in a dealer branch shop in accordance with the editorial information which is indicative of the editing effected on the image and which has been automatically downloaded from the dealer HQ shop to the dealer branch shop.

The data automatically downloaded from the dealer HQ shop 5 to the branch shop 1 consists of the "editorial information" 33 alone, which does not contain the image data. The amount of the information data is therefore small and, hence, can be downloaded in quite a short time, i.e., instantaneously.

The computer of the dealer branch shop 1, upon receipt of the "editorial information", operates to link the editorial information with the "high-resolution image for printing" which has been stored in the database of the branch shop 1, and performs rasterization and the required image processing such as red-eye processing 41, followed by printing performed by the printer P. The user 7 can obtain the print products 8 when he visits the branch shop 1 or by means of a professional transportation/delivery service.

Figure 5:
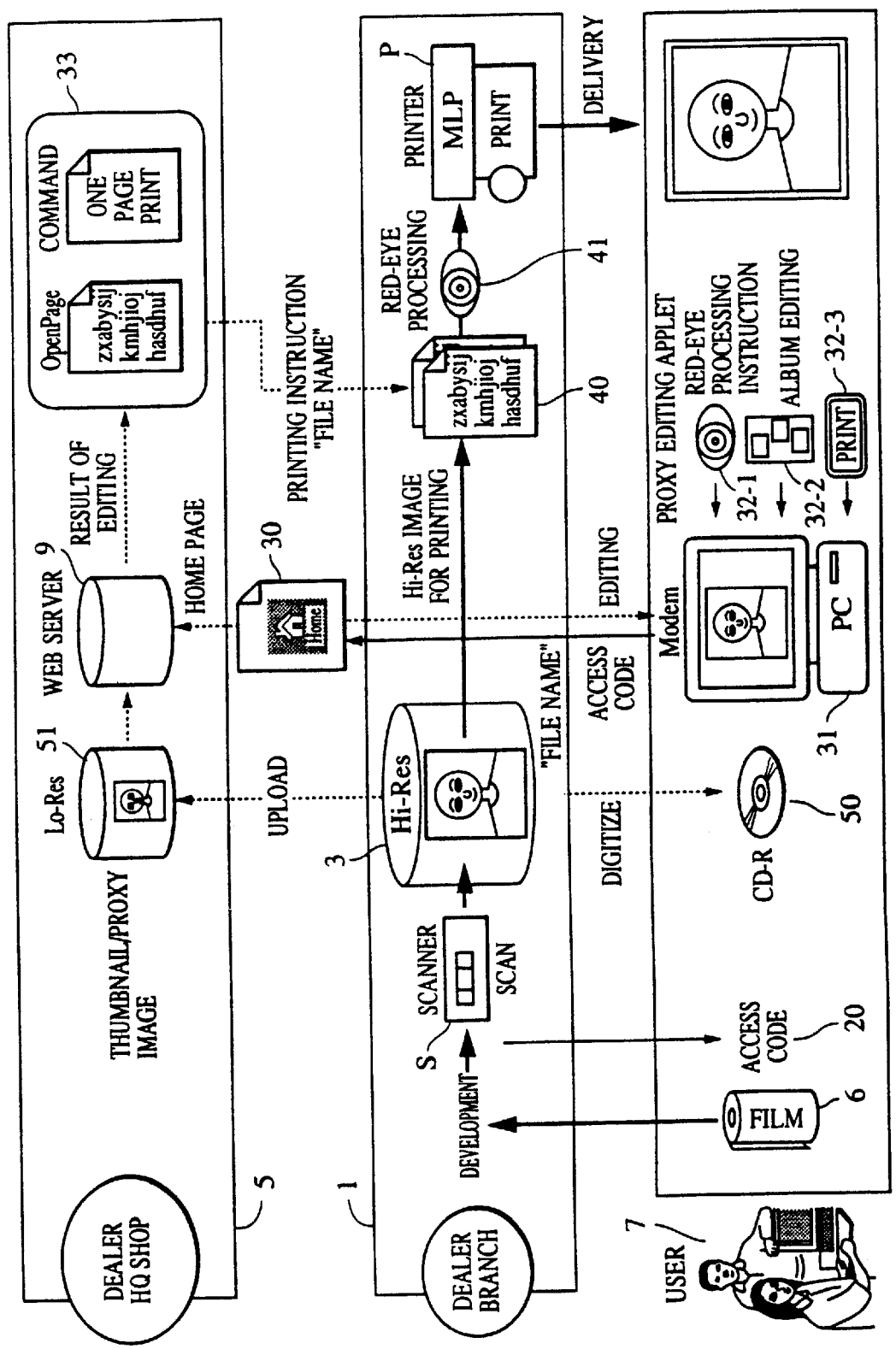
FIG. 5 is a flowchart illustrative of the whole image processing including the processed shown in FIGS. 2 to 4, as well as the flow of basic service which will be described later.

FIG. 5 is a flowchart showing the flow of the whole image processing explained before in connection with FIGS. 2 to 4 and a basic service which will be described later. Referring to FIG. 5, low-resolution proxy images and thumbnail images uploaded from the branch shop are inclusively denoted by 51. These images are referred to from the homepage 30 of the web server 9.

The user can enjoy a digitize service if he so wishes. The results of the service are delivered to the user at, for example, the dealer branch shop, in the form of a high-definition image 3 stored in a CD-R 50. Service is also available for reading and editing images contained in a CD-R brought by the user to the shop, uploading the same in the web server 9 or printing the same by means of the printer P.

Basic Service

The described embodiment can offer the following basis services:

"Digitize service, Network service, Contents service, CD-R digitize service"

Figure 6:
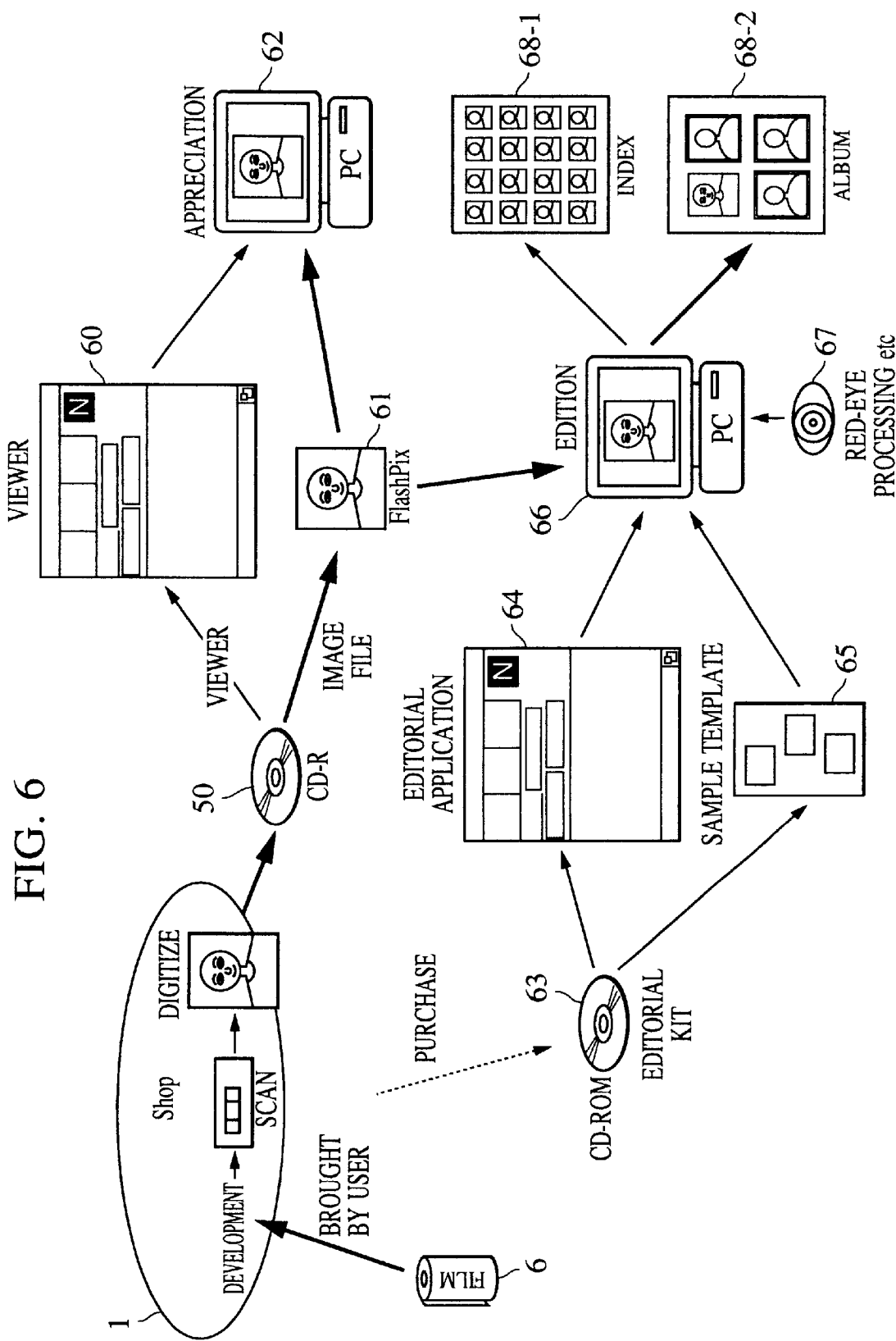
FIG. 6 is an illustration of a digitizing service which is one of the basic services offered by the embodiment.

The digitize service using a CD-R will be described with specific reference to FIG. 6.

The digitize service offered by the described embodiment uses a CD-R 50. In this service, the images developed from a film 6 brought by a user to a shop is read by means of a scanner so as to be digitized, and the thus digitized images are written in the CD-R 50 which can contain up to 200 frames of pictures. It is not necessary that each CD-R 50 can be filled up with images per one time of service. Namely, the user can keep a CD-R 50 having a vacant storage area and bring the same to the shop where additional images are written in the vacant storage area.

The image files to be written in the CD-R 50 have been formed following, for example, the Flash Pix file format. A "viewer" 60 is written in the CD-R 50 at, for example, free charge simultaneously with the images. The user downloads the viewer 60 into his own computer 62, e.g., a personal computer, so that the user can observe the images 61 on the display of his own computer.

In the embodiment as described, the use of the Flash Pix format on the CD-R 50 permits an extremely high speed of browsing by means of the viewer, thus enabling full use of the advantages of the hierarchical coding.

The user can conduct editorial work on the images stored in the CD-R 50 by using his own computer. An editorial kit CD-ROM 63, containing various tools which facilitate image editing processings, is available to assist the user. For instance, a CD-ROM is prepared following the packet-write system "UDF format" of Adaptec. Obviously, the format may also be the packet-write system "CD-RFS format" of SONY.

The editorial kit 63 contains sample images and templates 65, in addition to the full-scale editorial application 64, so that the user can effect on his own computer 66 the editorial processings equivalent to those conducted at the dealer branch shop.

The computer 66 with the editorial assembly 64 installed thereon enables the user to easily work out a high-quality image, as the user inserts his image 61 read from the CD-R 50 in the desired template 65. The user can further effect various kinds of image processings such as red-eye processing 67, and can effect various kinds of printing such as index printing 68-1, album printing 68-2 and so on.

Referring again to FIG. 5, a description will be made of the network service which uses the network. The description will begin with an interface net printing instruction service which gives an interface net printing instruction.

A user qualified to make access to the Internet can enjoy this service. Such a user makes access to the web server of the franchisee of this service by using a commercially available web browser, so that a menu for enabling the user to input a password is sent from the HQ shop and displayed on the user's computer.

The user then inputs the access code (password) 20 which was informed to the user from the branch shop (franchisee) when the user requested the branch shop to develop the image on his film. In response to the input of the password, a list or inventory of the thumbnail images (not shown) concerning the film is displayed on the display of the computer 31. The user then clocks the "printing" button 32-3 which is shown at a lower part of the display frame, so that an "index print" 8-1 similar to that described before in connection with FIG. 2 is printed at the dealer branch shop.

Clicking of a specific one of the displayed thumbnail images causes this thumbnail image to be displayed at a greater scale, e.g., at ¼ Base. Clicking of the "print" button 32-3 in this state causes the "enlarged" image 8-2 to be printed in the same manner as that described before in connection with FIG. 2.

A description will now be given of the network service. As described before, the network service is available for enabling a user to make access to the web server of a franchisee of this system from his home, so that the image belonging to the user is displayed on the computer of the user's own so as to enable the user to edit the image for the purpose of, for example, making an album. Most of the basic functions of the "network image edition order/acceptance system" of the described embodiment can be employed in this network service.

The user need not purchase any special application for the purpose of enjoying this service, if the user's computer is prepared to make an access to the Internet. That is, the user can conduct the editorial processing by using a Java applet or plug-in device downloaded to his own computer.

In order to implement this operation, the described embodiment employs a concept of "proxy edition". The user's machine (local machine) downloads a low-resolution image from the HQ shop of the dealer and effects various editorial processings on this image. The local machine then transmits the script of the editorial results alone to the machine of the dealer branch shop which serves as the server machine. The machine of the branch shop then effects an editorial work in accordance with the above-mentioned script on the high-resolution image which has been read and stored in this branch shop. Thus, the high-resolution image which has been prepared for the printing is edited in accordance with the user's request, and the thus edited image can be printed out and delivered to the user at the dealer branch shop. To receive the printed images, the user himself may visit the branch shop or request a professional transportation/delivery service which is commercially available.

Home-laboratory System

A system which enables whole or most of the process including photographing, scanning, image processing/ edition and printing to be performed at the user's home will be referred to as a "home laboratory system".

Figure 7:
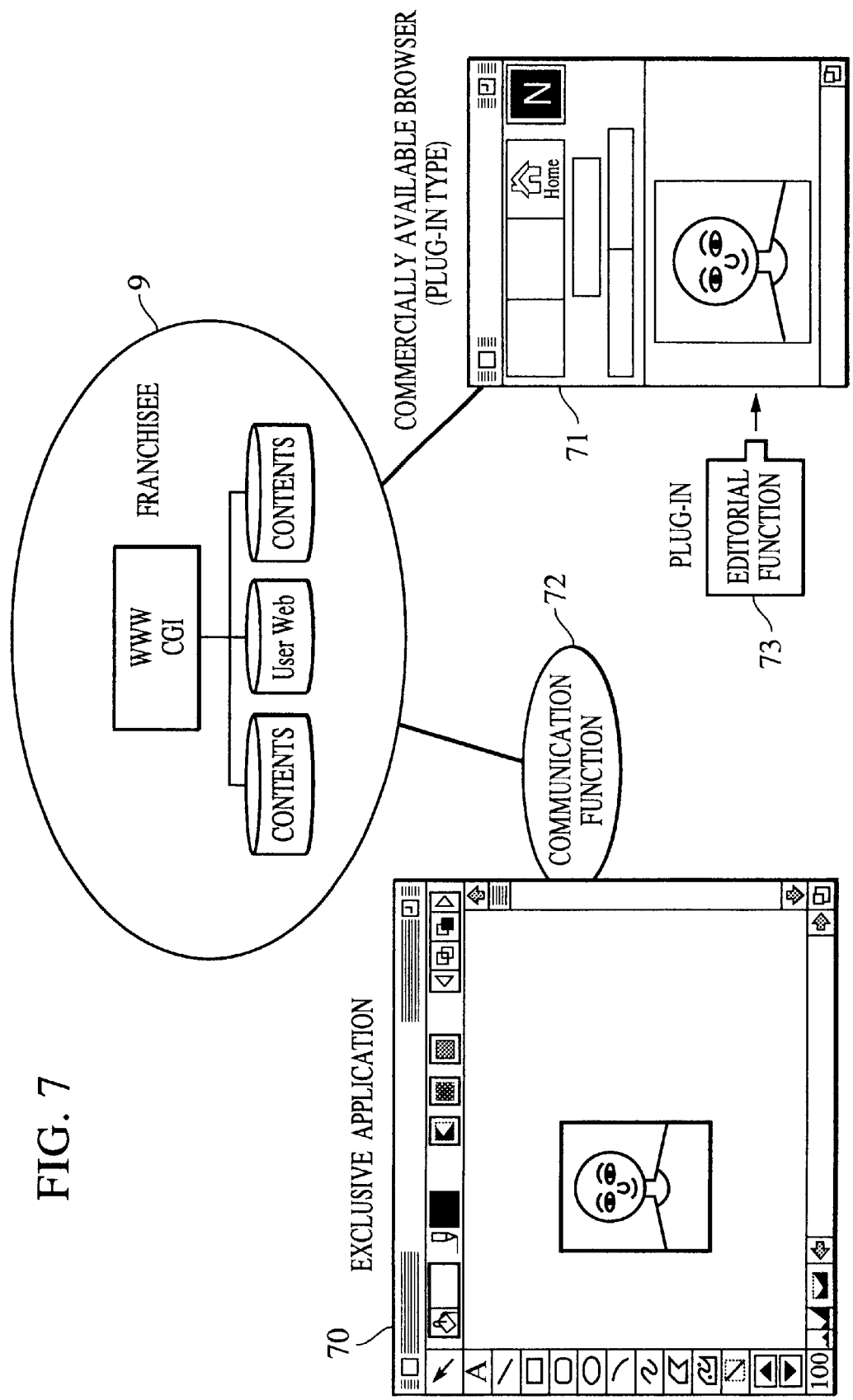
FIG. 7 is an illustration of two different methods for implementing a home-laboratory.

As shown in FIG. 7, the method for implementing the home laboratory system can be sorted into two types: "stand-alone type" (exclusive application type) 70 and the "browser type" (plug-in device type). The stand-alone application by itself possesses a high degree of editorial functions and can perform all kinds of editing without requiring connection to the internet.

In either type of the method, the user requests a franchisee of this service system to read and digitize an image or picture such as a photograph, for example, and as described before, and downloads a low-resolution image generated from the digitized high-resolution image via a communication function 72, for example, for the purpose of the editorial processings described before.

The user can print out the image thus downloaded and edited, if the comparatively low resolution of the image is acceptable. However, if the user wishes to obtain high-resolution print output, he has to make an access to the Internet to link this image with the system of the described embodiment. The communication function 72 may be a standard communication module relying mainly on the HTTP protocol.

Referring now to the browser-type arrangement 71, there is no editorial function although a communication function is available, because the browser is a kind of software for viewing only. It might be possible that the server 9 provides, by making full use of the CGI (Common Gateway Interface) function, an effect as if edition has been effected on the image. This solution, however, is quite unnatural and unreasonable, because the response from the server is too slow. However, a commercially available browser such as Navigator or Explorer can have an "exclusive editorial screen", if a plug-in device 73 of editorial functions has been downloaded beforehand from the server, as shown in FIG. 7.

Security (1) Restriction of communication function

It is conceivable to purchase and use an exclusive security server when using the network in order to ensure security. Use of such a security server as an essential requisite, however, will raise the fees of the services to such an extent that the intended business cannot be realized. Basically, a commercial security server is to enhance the security by cutting off any communication protocol which is not necessary for the business.

In the described embodiment, therefore, all the functions which are not necessary for implementation of the system are cancelled from among various communication functions contained in the Windows-NT server, whereby the required security can be obtained by a simple measure, without requiring the use of expensive security server.

For instance, the following well-known communication protocols supported by UNIX may be deleted when setting up the system of the described embodiment. In particular, FTP, TELNET, RLOGIN and so forth are risky protocols which tend to allow easy invasion by hackers and, therefore, are cancelled as these protocols are not necessary in the system of the described embodiment.

More particularly, the system of the described embodiment employs only the HTTP protocol existing on the UDP and the peculiar communication protocol which uses the UDP socket.

(2) Restriction of dealer address

In this embodiment, not all the dealer shops are allowed to make access to the HQ shop. That is, a control is made to accept only registered dealer addresses.

(3) Dealer password

Passwords (access codes) which can be set by each dealer shop are used to enhance security.

Hardware Architecture of Web Site For example, the web site hardware architecture is as follows:

(1) Server site

At the server site, a Windows-NT server is used as the Web server, together with a hard disk device of 32 GB and a 512 Kbps exclusive communication line.

(2) Retail site (a)

At this site, Windows-95 is used as the Web server, together with a hard disk device of 4 GB and a 64 Kbps exclusive communication line.

(3) Retail site (b)

At this site, Windows-95 is used as the Web server, together with a hard disk device of 4 GB and a 64 Kbps dial-up communication line.

Basic Functions of Web Server 9

The Web server 9 is required to have the following basic functions.

(1) Processing generally required for the Web server in accordance with the HTTP protocol (2) Functions as NT services (3) Definition of MIME format based on file extension code (4) Basic authentication function The CGI function for causing the Web server to conduct a specific action and an ODBC (Open Database Connectivity) support for realizing connection to database are essential functions. Among the Web servers, a server suitable for implementing the system of this embodiment is selected out of underlined servers. For instance, the Commerce Server of Netscape may be used as the Web server.

Figure 8:
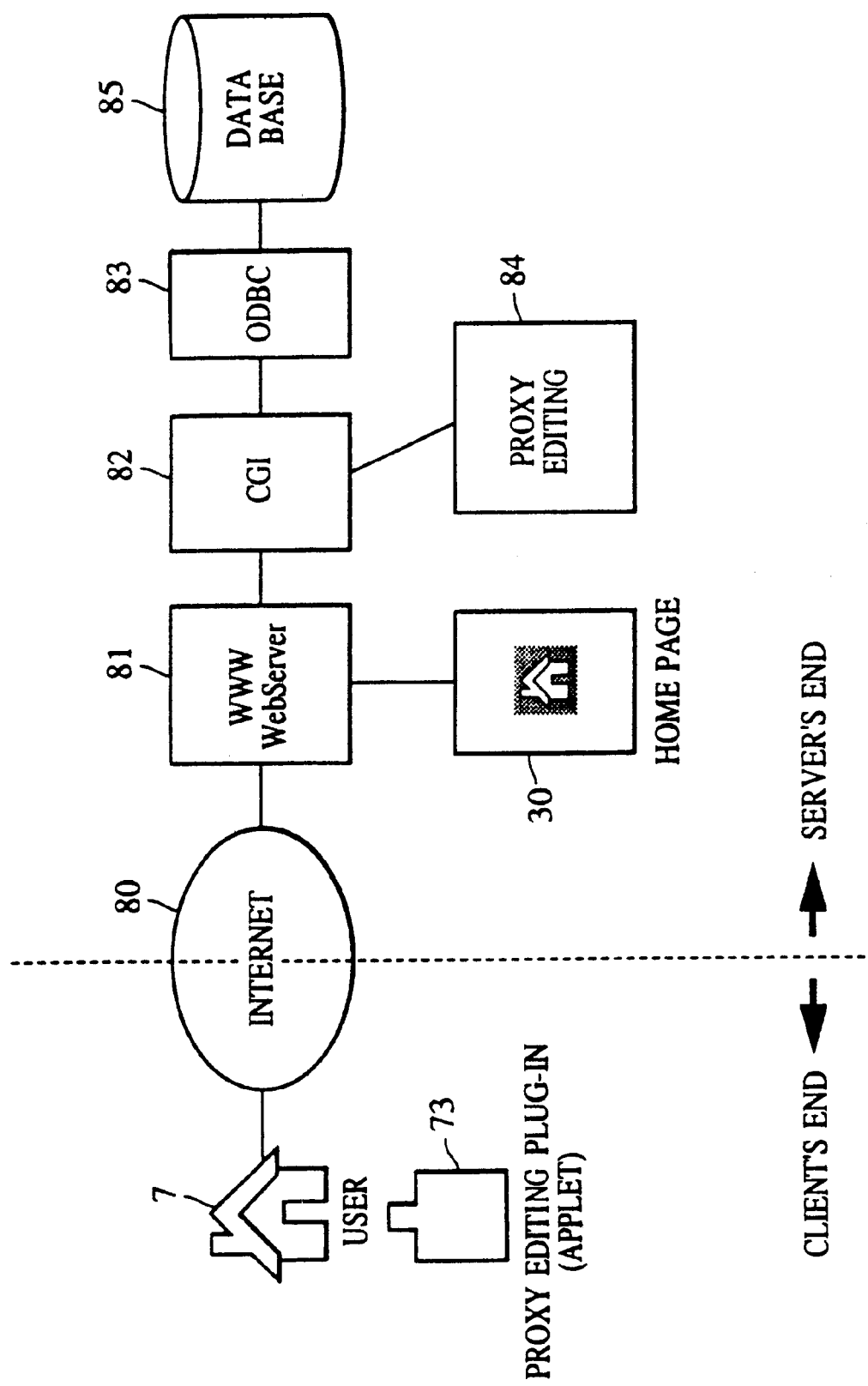
FIG. 8 is an illustration of the hardware architecture at the server's end of a system embodying the present invention.

FIG. 8 shows the basic system arrangement of at the server's end 9. A user having his computer at his home can make access to the commerce server site from his home through the Internet 80. In this case, the user at first visits a virtual DEP shop (photograph dealer shop) assumed in the commerce server homepage on the web server 81. The homepage 30 peculiar to the system of this embodiment has been opened on the web server 81.

The web server 81 itself has nothing but a function for transferring, i.e., downloading, a designated file to a client (user) 7. It is therefore difficult to implement various server functions by using only the web server 81 and the homepage 30. Therefore, an interactive server function is set up by using a CGI (Common Gateway Interface) 82.

Obviously, the CGI scripting is not infinitely powerful, and programs of higher grades have to be written by means of DLL (Dynamic Link Library). Other languages such as Java and Visual Basic may also be used for this purpose. In the illustrated embodiment, the proxy editorial program 84 is set up both on the server's end as at 84 and on the client's end (user's end) as at 73.

The proxy editorial plug-in device 73 provided on the client's end is similar to so-called image editing application and possesses functions for displaying templates, editing and importing of files, in addition to basic editorial functions to be effected on low-resolution images such as editing, rotation, conversion, moving and synthesis. These functions can be performed at extremely high speeds because they are effected on low-resolution images having resolutions as low as those of display images, e.g., 72 to 100 dpi.

In contrast, the function of the proxy editorial software 84 at the server's end operates as a backstage function which supports the proxy editorial plug-in device 73 of the client's end. That is, the proxy editorial software 84 performs, in accordance with demands given by the CGI 182, functions which can never be implemented by the cooperation between the WWW web server 81 and the homepage 30. Thus, the main jobs of the proxy editorial software 84 are: (1) automatic generation of homepage, (2) downloading of image files and templates requested by the client and (3) access to the database. The database 85 can be accessed from the CGI program 82, via the ODBC interface 83 for example. The database 85 stores user's administrative information such as the access code.

The program on the client's end is generally referred to as "plug-in device" 73 or "Java applet". Design can be made easily if the web server directly supports DLL-CGI on the server's end and the client's end.

It is desirable that connection to the database can be achieved easily. The ODBC is an interface which is unsatisfactory in regard to the transmission rate. It is, however, still preferred that a web server in support of the ODBC is used as in the case of the described embodiment.

Software Architecture of web Server Site in this Embodiment

Figure 9:
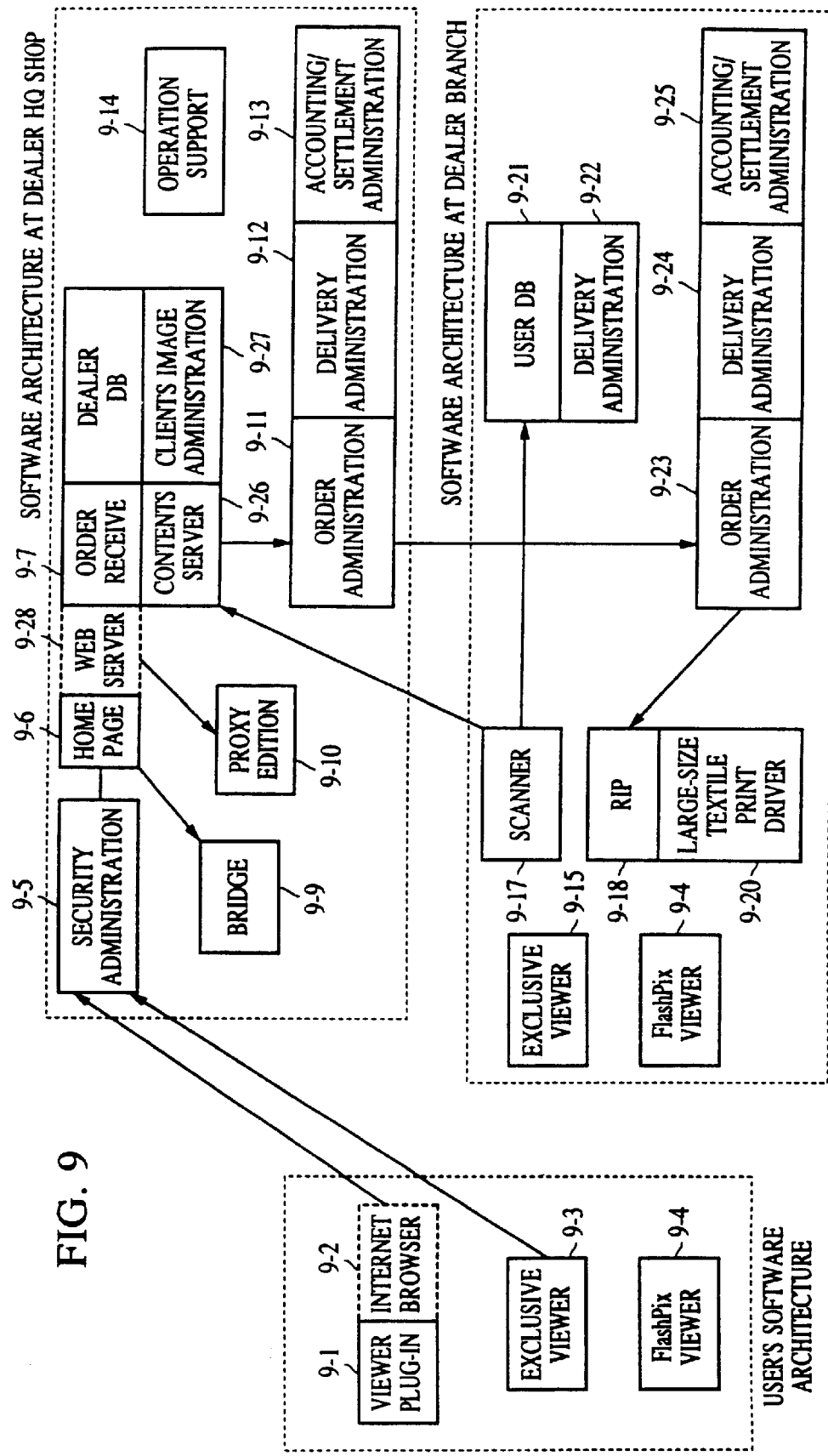
FIG. 9 is an illustration of the hardware architecture of a Web site in the system embodying the present invention.

FIG. 9 shows the software architecture at the web site in the described embodiment.

The following kinds of software are installed in the dealer HQ shop, i.e., at the web site which provides the communication service in accordance with this embodiment: security administration software 9-5 which ensures security when the computers of individual users are connected to the dealer head shop; homepage 9-6 of the dealer head shop; web server/order receive software 9-28/9-7; proxy edition system 9-10; client's image administration software 9-27; order administration software 9-11; accounting/settlement administration software 9-13; dealer database 9-8; operation support tools 9-14; connection server (bridge) 9-9 for connection to other network; print delivery administration software 9-12 and contents server 9-26.

On the other hand, the dealer branch shop has the following types of software: client's image administration software 9-22; order administration software 9-23; accounting/settlement software 9-25; exclusive viewer software 9-15; Flash Pix viewer software 9-16; and viewer plug-in device (exclusive viewer) 9-15.

Preferably, the dealer branch shop also is equipped with the following kinds of software to implement a proxy editorial system: exclusive viewer software 9-15; large-size, textile print driver 9-20; an RIP (Raster Image Processor) 9-18; a scanner driver 9-17; user data base 9-21; and print delivery administration software 9-24.

The following kinds of software are installed at the user's end: Flash Pix viewer software 9-4; a viewer plug-in device 9-1; exclusive viewer software 9-3; internet browser 9-2, and so forth.

The homepage 9-6 employed in the system of the described embodiment appears on the user's computer display first of all when the user has made an access to the dealer head shop. The homepage is written in HTML and has a plurality of hierarchical architectures with the following pages.

Homepage:

This is the page which indicates that the user has entered the system of this embodiment Site Page:

This is a page which enables the user to see a list of dealer shops.

Service Page:

This is a page showing a schedule of additional-value services available.

Order Page:

This page enables execution of services such as printing (CGI)

Thumbnail Page:

This page shows thumbnail images (automatically formed by CGI)

Editorial Page:

This page enables edition such as album editing (Java support)

Help Page:

This page shows the procedure of operation (possible to retrieve through keyword)

Note Page:

This page is displayed in the event of a wrong operation by the user.

Homepage Used in this Embodiment

The homepage is written in HTML and is intended to introduce the services available through the system of the described embodiment. Any person from anywhere over the world can make access to this homepage. The contents should contain at least the following items.

Features/Advantages of the System

The following service contents of the system of this embodiment may be included: a free-of-charge demonstration display; index of contents services; service menu for the instant month; site information; fee schedule; and so on.

A description will now be given of the function of each software module.

Web Server/order Receive Software order from a client is received and accepted via the internet by the homepage written in HTML and the background-running CGI script/CGI computer. More specifically, specifications such as the client's name, access code, kinds of service requested, number of prints to be produced and so on are received in an interactive manner. At the beginning of the use of this system, transmission of client's confidential information such as credit card number is not required, and only registration at the shop is required for the purpose of identification. However, when safety and reliability of the Netscape Commerce Server is confirmed, orders by credit will become acceptable via the internet.

Proxy Editorial System

This system is used when the server stores only the thumbnail images (¼ Base) and proxy images (Base) while high-resolution images (4 base, 16 Base) exist only in the dealer's machine. The client makes access to the server to download the thumbnail images and proxy images and effect desired editorial processings or album editing work on these images. Only the editorial information is sent back to the server. When an order for printing is given by the client, the server transfers the editorial information to the dealer's machine which in turn automatically performs, in accordance with the received editorial information, editorial work on the high-resolution images stored therein, and prints the edited high-resolution images.

Facilities which in a narrow sense may be called programs exist both at the server's end and the client's end. More specifically, the client's end has editorial functions for editing the proxy images and an image edition plug-in device (or applet) having a function to store all the editorial procedures taken by the client, while the server's end has a server function for transferring the images to the client and a function for storing the "editorial information" which indicates the types and contents of the edition made by the client.

The server sends the "editorial information" to a specified dealer shop in accordance with instructions given by the "order receiving software".

Client's Image Administration Software

The images deposited by the client are held uploaded at free charge over a predetermined number of days as of the day of scanning, e.g., 30 days. The client can maintain the images uploaded upon payment of additional fees, otherwise the images are deleted. This administration deals with various data distributed over the network and, hence, cannot be implemented by an ordinary database, but an be realized by using the concept of process script.

Order Administration Software

This is a combination of software and a database which administrates the types and contents of the order given by the client and gives instructions to the necessary dealer machines in regard to the types and contents of the processings to be performed by the machine, while administrating the progress of the work which is being executed in compliance with the user's order.

It is difficult to produce print outputs to cope with the client's request without fail by correctly combining various resources distributed over the network and to maintain client's image information without deleting over a predetermined period. This problem, however, can be dealt with by using the concept of process script.

Accounting/settlement Administration Software

This software administrates the amount of money to be credited to the client and the amount to be credited to the dealer branch shop and enables the HQ shop to charge the credit card company the total amounts on behalf of the branch shops inclusively.

Dealer Database

This is a software/database which is employed by the head shop of a franchise business for the purpose of administrating the status of the membership of franchisees or branch shops, statuses of equipment in these branch shops, amounts of credits, and so forth.

Security Administration Software

This software prevents any unlawful access to the server. The security is implemented by a combination of: (1) restriction of the communication protocol; (2) exclusion of access from any terminal having non-registered address; and (3) use of password (access code).

Operation Support Tools

In a franchise or chain system having a head office and branch offices, all the servers may be administrated at the head shop. Thus, the HQ shop is most administrative. The operation support tools assist the server administrator of the HQ shop in making investigation of the statuses of the branch shops or in aiding the branch shops through the network. An on-line access by a specific protocol is possible to branch shops which are connected to the head shop through exclusive lines. In regard to the branch shops which are connected through dial-up lines, access is made most conveniently by making inquiry in terms of the process script. Although a standard network management system is available as the protocol of the kind described, the system in accordance with the invention may employ a specific exclusive administration system.

Server for Connection to other Network

This implements a gateway function for enabling cross-linking with a business entity which offers similar or related services.

Print Delivery Administration Software

As a rule, the printed images are handed over to the user when the user visits the shop. However, delivery may be made by mailing or the like upon user's request. To comply with such a request, a function is available to print an address seal so as to simplify the delivery work.

Contents Server

This enables the user to use, with payment, the contents offered by a greeting card company through the internet. The contents of services of the greeting company are linked with the services of the system of this embodiment in a seamless manner in regard to protocols, so that the user can enjoy the services offered by the greeting card company in the same way as the selection of templates prepared in the system of the described embodiment.

Flash Pix Viewer Software

This is a viewer for enabling reading, writing and displaying of Flash Pix file. Editing of images, however, is not possible with this viewer.

Viewer Plug-in Device

This is a viewer plug-in device following Netscape specifications, capable of displaying files in the system of the described embodiment. Editing is not possible. In general, Netscape enables display of only the texts written in HTML or images processed by GIF or JPEG. However, this plug-in device, when loaded, permits the book files (.BK) adapted to this system and stored in the Web server to be displayed and edited.

Exclusive Viewer Software

This is an application software for a stand-alone device, and is basically the same as the viewer plug-in device except that it does not necessitate Netscape browser.

Large-size, Textile Print Driver

This is a printer driver for enabling large-size, textile printing from commercially available package applications.

Figure 10:
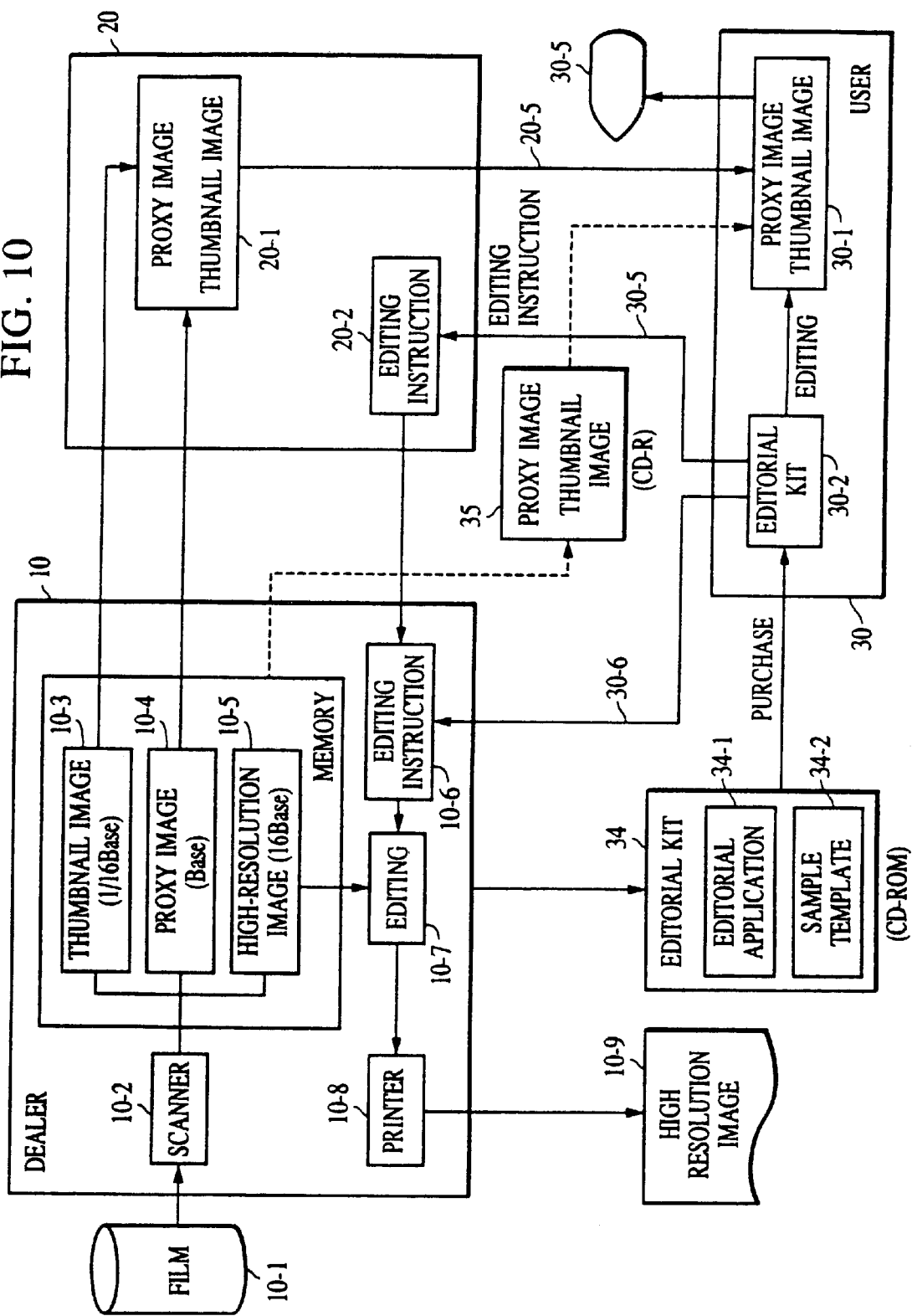
FIG. 10 is a diagram showing the flow in basic blocks of the system embodying the present invention.

The flow of the basic process described hereinbefore is illustrated in FIG. 10.

In the described embodiment, the process begins with the action of the user to bring the exposed film 10-1 to a shop 10. In the shop 10, the images on the film 10-1 is read by means of a scanner (S) 10-2, whereby a high-resolution images 10-5 to be used for printing are obtained, as well as low-resolution proxy images 10-4 for the display purpose and thumbnail images 10-3 for retrieval purpose. These images are stored in the storage device installed at the shop 10.

The low-resolution thumbnail images 10-3 and the proxy images 10-4 are sent as required to a HQ shop 20 or to the user and are stored as display images 20-1, 30-1.

The user can download these low-resolution image data from the head office 20 or from the branch shop 10 through a communication line 20-5 or 30-6. The user also can obtain the low-resolution image data in the form of data stored in a CD-R 35 prepared at the branch shop 10, so that the user can read the data and store the same in his own computer.

The user can put the low-resolution images on the display 30-5 of the user's own and can give desired image editorial instructions. The image on the display 30-5 is changed in accordance with the editorial instructions so that the user can confirm the result of the edition. Simple programs and so forth to be used in the edition may be acquired by downloading from the HQ shop 20, although the user an most conveniently purchase the programs in the form of an editorial kit stored in the CD-ROM 34 available from, for example, the branch shop 10. This appreciably saves time and memory size required for the communication.

The editorial kit 34 stores various editorial applications 34-1 necessary for the editorial processings, together with templates which contribute to easy selection of layout of images in the course of the editorial work. Thus, editing of images can be facilitated when the user makes reference to the templates.

The user gives desired editorial instructions by using, for example, the editorial kit, while monitoring the proxy imaged displayed on the display unit 30-5. These editorial instructions 30-5 or 30-6 are sent to the HQ shop 20 or the branch shop 10 from which the images to be edited have been downloaded to the user's computer. When the editorial instructions have been received by the HQ shop 20, such instructions alone are transferred to the branch shop 10.

The branch shop effects editing on the high-resolution image 10-5 in accordance with the received editorial instructions, and produces print output 10-9 by means of the printer 10-8. The print output is delivered to the user when he visits the shop 10 or by way of mail.

The sample templates 34-2 include a plurality of types of templates having predetermined output formats. It will be understood that the templates serve as the "pasteboards" of an album to be formed. Each template has been designed by, for example, a professional designer so as to be wholly colored or to have a background picture or pattern. Thus, various designs of templates are usable.

Various kinds of templates are prepared and available, such as a book in which a plurality of templates are assembled together in the form of a book, photographs which can be used as background images, clip art arranged for selection and clipping by the user, photo-borders, and so forth. Image slots where the user can insert image information and text slot where the user can insert text information are laid out on each template, together with a background image or the like. The template information held by the sample templates 34-2 includes only layout information and background.

The layout of slots and other design factors on each template follow the intention of the person who forms the templates. For instance, the positions of slots are fixed on the template if the person who forms the template wishes to prohibit free change of the positions and number of the slots. Conversely, in case of a template intended to allow the user to freely change the slot positions, the slot positions are changeable.

Various kinds of text slots are also available, such as a text slot in which text information has already been laid out in unchangeable manner or in a manner to allow a free change by the user, and a text slot in which no layout has been made initially to allow the user to freely define and use this text slot. Various types of layout are also available for the background image. For instance, there are templates which permit the user to freely select and adopt a specific one from among a plurality of photographic background images or art images (clip arts) prepared in advance, as well as templates in which the background images are fixed in a manner to prohibit a change by the user. Thus, the user can select any desired number of templates of any desired type, from among the abundant templates.

There are also templates which permits the user to define the effect of the borders of the frames. With such templates, the user can define various types of border processings such as adoption of monochromatic frames or gradating of the frame borders.

The template definition information is held in relation to the template selection information. The selected templates form a group which is termed as a "book". Template selection information and template definition information concerning the templates forming a book are stored in relation to the book. A template is selected for each page of the book. Pieces of information such as the information for defining the processed images selected for the template are stored on page basis. At the same time, definition information concerning each of the selected images is stored on template basis.

In the processing for producing actual print output, image processings are effected on the original image, i.e., the high-resolution image 10-5, in accordance with the definition given by the editorial instructions 10-6, and the image this processed is inserted into the template. The templates having the images inserted thereto and carrying, as required, texts and/or background images are assembled into a book which is delivered to the user as the final product.

The basic process performed by the system of the embodiment has been described. The system of the described embodiment, however, can provide further features and advantages as described below.

Simulative Opening of Server Through Dial-up Connection

Figure 3:
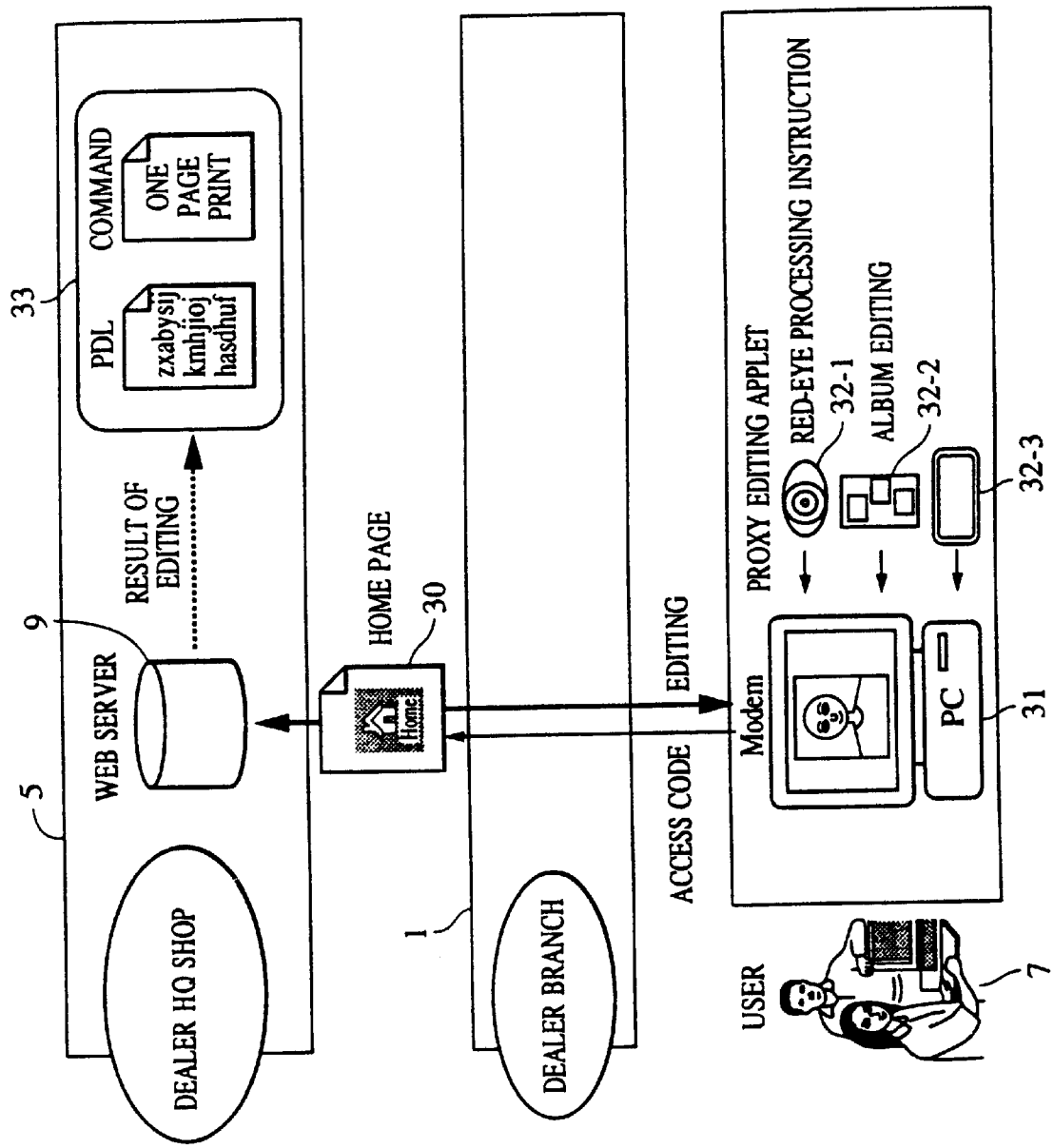
FIG. 3 is a flowchart schematically showing an image editorial processing communication performed between a user and a dealer headquarters (HQ) shop through a network in accordance with the embodiment.

In the system shown in FIGS. 3 to 5, the Web server of the WWW is opened to accept control and information from a web terminal in an interactive manner so as to offer the services in accordance with the accepted control and information. In this system, the control and information coming from the web terminal is once stored in the web server and, when an access has been made to the web server from a second server that has a dial-up connection function, the web server transfers the stored control and information to the second server, so as to enable the second server to execute the service in accordance with the control and information. Therefore, the second server which has dial-up connection function only can perform services in compliance with the request given from the web terminal. It is thus possible to provide a simulative server opening system which permits adequate image editing with reduced amount of data to be transmitted and which enables feedback of the results of the editing.

With the above-described simulative server opening method using the dial-up connection, it is also possible to implement a polling-type job accepting system. To this end, the second server is provided with a timer so that the second server automatically and periodically makes access to the web server, so that the request given from the web terminal reaches the second server without fail after the expiration of the period set by the timer at the latest. It is thus possible to realize an efficient and secure use of the communication line by the use of this polling job acceptance system. Furthermore, according to the present invention, a proxy editorial system using a network is implemented as follows. A high-resolution image to be used for the final printing and a low-resolution image for display are stored in a remote image editing station, and the low-resolution image alone is downloaded to a local image editing station from the remote image editing station via a network.

At the local image editing station, a required editorial processing is effected on the downloaded low-resolution image. Then, only the editorial information indicative of the contents of the editing effected is uploaded to the remote image editing station. In the remote image editing station, editorial processing exactly conforming with that performed in the local image editing station is effected on the high-resolution image which has been stored in the remote image editing station. It is thus possible to obtain a proxy image editing system which enables, without requiring transmission of the high-resolution image data through the network, production of a print output of high-resolution image which has undergone the desired editorial processing.

Thus, only the editorial information is sent to the remote image editing station and, in the remote image editing station, editorial processing exactly the same as that performed in the local station is effected on the high-resolution image. It is therefore possible to display the edited high-resolution image at the remote station, without requiring transmission of the high-resolution image data through the network.

A more efficient system for reconfiguring the results of the proxy image edition can be obtained by expressing the image in terms of a page description language and expressing also the editorial information, i.e., items of editing, in terms of the page description language, while the station which has received the image and the editorial information performs re-editing with no dependency on resolution.

The described embodiment of the present invention can adopt the following method of storing the image data. A digital image having a resolution of a level suitable for printing is formed by scanning and digitizing a photographic image developed on a photographic film or by reading a digital image from a digital medium such as a CD-ROM. The digital image is stored in an auxiliary storage device of a first computer. At the same time, a low-resolution image is formed by thinning the high-resolution image and is uploaded to the web server of the WWW. The uploaded low-resolution image is displayed by means of a browser application loaded in a second computer. Commands such as editorial instructions are given from this second computer to the web server which in turn transmits such commands to the first computer. The first computer then executes printing of the high-resolution image. It is thus possible to obtain a print output of edited high-resolution image data, with reduced size of data to be exchanged.

In the image data storage method described above, the templates may be stored in accordance with the following method. That is, the templates as the models of the image edition are stored in the web server and used as the templates to be displayed by the browser application loaded in the second computer. When a printing instruction is received, the templates are sent together with the editorial information to the first computer, so that the first computer can perform printing of high-resolution image edited by using templates.

A description will now be given of an arrangement which is intended to avoid overflow of the image storage area in a branch shop.

Figure 11:
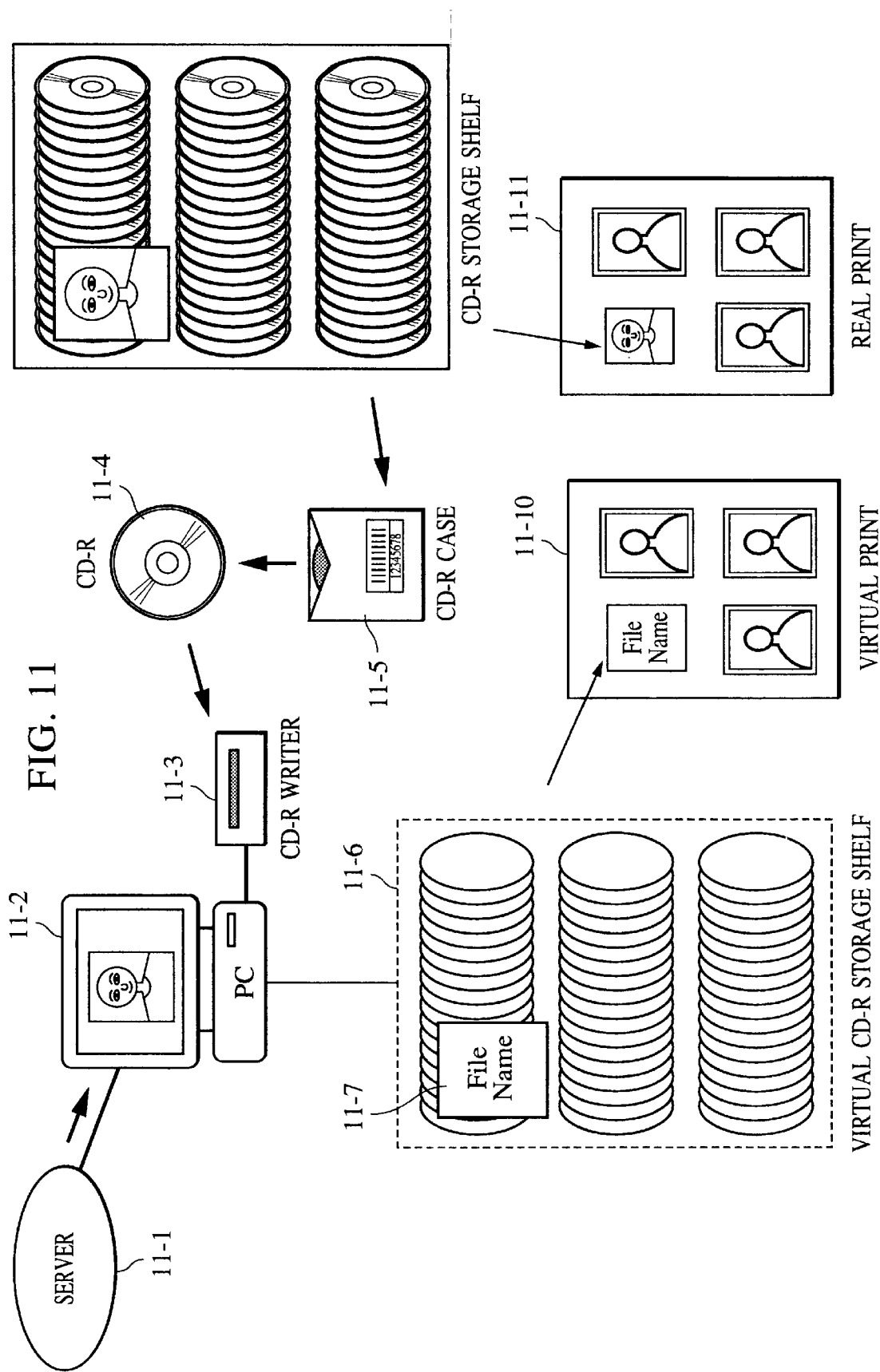
FIG. 11 is an illustration of another form of the dealer branch shop.

FIG. 11 illustrates a virtual file system for filing high-resolution image data to be used for printing. A server 11-1 serves to transfer a printing job to a dealer branch shop via a network. A computer 11-2 is installed at the dealer branch shop. A CD-R writer 11-3 enables writing and reading of image data and so forth in and from a CD-R which is denoted by 11-4 and which is encased in a CD-R case 11-5 made of paper. A virtual CD-R storage shelf 11-6, serving as a virtual filing system has been set up on the hard disk of the computer 11-2. Numeral 11-7 designates a chart which schematically shows the file names or directory information concerning the images under the administration of the virtual CD-R storage shelf. Numeral 11-8 indicates an actual CD-R storage shelf. Numeral 11-9 denotes a chart which schematically shows the high-resolution images stored in the CD-Rs in the actual CD-R storage shelf. Numeral 11-10 shows the results of virtual printing virtually performed by using the information stored in the virtual CD-R storage shelf 11-6. The virtual printing result constitutes a print cue formed on a local disk. The result of actual printing is denoted by numeral 11-1.

Each CD-R 11-4 digitally stores an administration number of its own. The administration number has been presented on the CD-R case 11-5 in the form of a bar code. When the CD-R 11-4 is formed by the CD-R writer 11-3, the bar code indicative of the administration number is read by the computer 11-2 by means of a bar code reader (not shown) and is digitally stored in the CD-R. The CD-R case 5 also carry a print in the form of characters or numerals indicative of the same content as the bar code, visually recognizable by human eyes. Since different cases 11-5 have different numbers, it is possible to identify each of the CD-Rs stored in the actual CD-R storage shelf.

The CD-R administration numbers are used for the purpose of administrating the CD-Rs in the virtual CD-R storage shelf, i.e., in the virtual file system. With this CD-R administration number, it is possible to store the virtual CD-Rs in the virtual CD-R storage shelf 11-6 while linking the virtual CD-Rs with the actual CD-Rs stored in the actual CD-R storage shelf 11-8.

Printing commands coming from the server 11-1 have been written, for example, in script form. If the printing commands contain a code indicative of a specific image data (File Name), the command is substituted by the specified directory of the virtual CD-R storage shelf 11-6 and a virtual printing operation, i.e., writing in the local disk, is performed with the specified directory.

After completion of the virtual printing operation, the computer 11-2 informs the server 11-1 that the printing has been completed in accordance with the printing instruction commands given from the server 11-1, thus safely terminating the exchange of jobs. An operator of the computer 11-2 then operates the computer 11-2 at convenience and, if the virtual prints, i.e., printing jobs, have been accumulated, manually gives an instruction to the computer 11-2 to execute the actual printing.

Most of the virtual prints accumulated in the print cue are written in page description language and, hence, can be developed into a bit map by means of a rasterizer. When the printing has proceeded to a portion of the data which refers to an image file in the virtual CD-R, the administration number of the actually stored CD-R corresponding to the above-mentioned virtual CD-R appears on the display, so as to request the operator to insert the image. In response to this request, the operator takes out the CD-R identified by the administration number out of the CD-R storage shelf 11-8 in which CD-Rs are stored in the order of the administration number. The operator then sets the CD-R on the CD-R writer 11-3 and continues the execution of the process, so that the high-resolution image which has been stored for the printing purpose if automatically read and substituted for the corresponding image area of the virtual print, whereby an actual print output 11-1 is produced by a printer which is not shown.

As will be understood from the foregoing description, according to the illustrated embodiment of the present invention, a user can effect any desired editorial work on the photographs which have been taken by the user, through a computer at his home. The user therefore can obtain print outputs of the photographs edited in accordance with his editorial intention. It will be seen that edition of photographs can be conducted through communication between the user's computer and the photograph shop, with reduced size of the data transmitted through the network.

Other Embodiments

The present invention can be incorporated equally well both in a system composed of a plurality of component apparatuses such as a host computer, an interface device, a reader, a printer and so forth and in a single apparatus such as a copying machine, facsimile apparatus or the like.

Obviously, the foregoing objects of the present invention can be achieved by using a storage medium which stores the program codes of software implementing various functions employed in the described embodiment. The storage medium is supplied to a system or apparatus so that the program codes stored in the storage medium are read and executed by a computer (or a CPU or an MPU) of the system or the apparatus.

When such a storage medium is used, the program codes read from the storage medium by themselves implement the functions of the described embodiment, so that the storage medium storing these program codes constitutes one aspect of the present invention.

Various types of storage media are available for use as the storage medium for supplying the program codes, such as a floppy disk, hard disk, optical disk, magneto-optic disk, CD-ROM, CD-R, magnetic tape, non-volatile memory card, ROM, and so forth.

In the above-described aspect of the invention, a computer reads and executes the program codes to perform the functions of the illustrated embodiment. This, however, is also illustrative. For instance, the invention also may be carried out in such a way that an OS (Operating System) or similar software working on the computer executes the whole or part of the actual processing in accordance with the instructions given by the program codes, so as to implement the functions of the illustrated embodiments.

It will also be clear that the present invention encompasses such a form that program codes read from a storage medium are written in a memory of a function extension board or a function extension unit received in or connected to a computer. In this form, a processing unit such as a CPU on the extension board or unit then executes whole pr part of the actual processings in accordance with the instructions given by the program codes, thus implementing the functions of the illustrated embodiment.

As has been described, the present invention advantageously permits editing and printing of high-resolution image information with reduced size of image data to be exchanged. In addition, the invention enables a user to effect any desired editing on the photographs taken by the user, by operating his computer at home, and to obtain a print output edited in accordance with his editorial intention. This advantage also can be enjoyed with a reduced amount of data to be exchanged between the user's computer and the photograph shop.

Although the invention has been described through illustration of preferred embodiments, it is to be understood that the described embodiments are only illustrative and various changes and modifications may be imparted thereto without departing from the scope of the present invention which is limited solely by the appended claims.

What is claimed is:

1. An image processing method for processing an image in a system having a plurality of remote image processing stations and a server image processing station which is capable of communicating with the plurality of remote image processing stations, comprising:

a first storage step, in which high-resolution image information is stored in a storage medium in one of the plurality of remote image processing stations;

a first transferring step, in which image information of a resolution lower than that of the high-resolution image information is transferred from the one of the plurality of remote image processing stations to the server image processing station;

a second storage step, in which the low-resolution image information transferred in said first transferring step is uploaded and stored in a web server in the server image processing station;

a first receiving step, in which a request for downloading the low-resolution image information is received from a user's terminal via an Internet at the server image processing station;

a second transferring step, in which the low-resolution image information stored in the web server is transferred from the server image processing station to the user's terminal via the Internet in accordance with the request;

a second receiving step, in which editorial information indicative of a content of editing which has been effected on the low-resolution image information on the user's terminal is received from the user's terminal via the Internet at the server image processing station;

a third transferring step, in which the editorial information is transferred from the server image processing station to the one of the plurality of remote image processing stations; and an editing step, in which the high-resolution image information stored in the storage medium is edited at the one of the plurality of remote image processing stations in accordance with the editorial information transferred in said third transferring step, wherein the server image processing station offers content information which can be commonly used by the user terminal in effecting the editing and the remote image processing stations in performing the editing step.

2. A method according to claim 1, wherein the high-resolution image information stored in said first storage step has been brought by the user to the remote image processing station.

3. A method according to claim 1, further comprising:

a conversion step, for converting an image carried by a photographic film into the high-resolution image information.

4. A method according to claim 1, further comprising:

a low-resolution image generating step, for generating the low-resolution image information from the high-resolution image information.

5. A method according to claim 1, wherein the low resolution image information is transferred in said second transferring step in response to a request given from the user's terminal.

6. A method according to claim 1, further comprising:

a printing step, in which the high-resolution image information edited in said editing step is printed.

7. A image processing system comprising a plurality of remote image processing stations and a server image processing station which is capable of communicating with the plurality of remote image processing stations, wherein each of said plurality of remote image processing stations comprises:

first storage means for storing high-resolution image information in a storage medium;

first transferring means for transferring image information of a resolution lower than that of the high-resolution image information to a web server in said server image processing station;

first receiving means for receiving, from said server image processing station, editorial information indicative of a content of editing which has been effected on the low-resolution image information at a user's terminal; and editing means for editing the high-resolution image information stored in the storage medium in accordance with the editorial information received by said first receiving means; and wherein said server image processing station comprises:

second receiving means for receiving the low-resolution image information transferred from each of said plurality of remote image processing stations;

second storage means for uploading and storing the low-resolution image information received by said second receiving means in the web server;

third receiving means for receiving a request for downloading the low-resolution image information from the user's terminal via an Internet;

second transferring means for transferring the low resolution image information stored in the web server to the user's terminal via the Internet in accordance with the request;

fourth receiving means for receiving the editorial information from the user's terminal via the Internet; and third transferring means for transferring the editorial information received by said fourth receiving means to each of said plurality of remote image processing stations, wherein the server image processing station offers content information which can be commonly used by the user terminal in effecting the editing and the editing means of the remote image processing stations in performing the editing.

8. A system according to claim 7, wherein the high-resolution image information stored in said first storage means has been brought by the user.

9. A system according to claim 7, further comprising:

a conversion means for converting an image carried by a photographic film into the high-resolution image information.

10. A system according to claim 7, wherein said first transferring means generates the low-resolution image information from the high-resolution information and transfers the thus generated low-resolution image information.

11. A system according to claim 7, wherein said first transferring means transfers the low-resolution image information in response to a request given from said user's terminal.

12. A system according to claim 7, wherein said remote image processing station further comprises printing means for printing the high-resolution image information edited by said editing means.

* * * * *

UNITED STATES PATENT AND TRADEMARK OFFICE
CERTIFICATE OF CORRECTION

PATENT NO. : 6,522,418 B2
DATED : February 18, 2003
INVENTOR(S) : Yokomizo et al.

It is certified that error appears in the above-identified patent and that said Letters Patent is hereby corrected as shown below:

<u>Title page,</u>
Insert Item:
-- [30]     Foreign Application Priority Data
   Japan 121319/1997, Filed May 12, 1997 --.

<u>Column 1,</u>
Line 29, "setup" should read -- set up --.

<u>Column 2,</u>
Line 11, "edition" should read -- editing --.

<u>Column 3,</u>
Line 23, "loaded down" should read -- downloaded --; and
Line 27, "processed" should read -- process --.

<u>Column 4,</u>
Line 2, "effect" should read -- effect, --; and
Line 3, "(change into blackeye picture)" should be deleted.

<u>Column 5,</u>
Line 22, "includes," should read -- include, --; and
Line 61, "head" should read -- HQ --.

<u>Column 6,</u>
Line 32, "employ" should read -- employs --.

<u>Column 9,</u>
Lines 19 and 20, "a" (first occurrence) should be deleted.

<u>Column 10,</u>
Line 26, "same" should read -- same assignee --.

<u>Column 11,</u>
Line 31, "basis" should read -- basic --.

UNITED STATES PATENT AND TRADEMARK OFFICE
CERTIFICATE OF CORRECTION

PATENT NO.   : 6,522,418 B2
DATED        : February 18, 2003
INVENTOR(S)  : Yokomizo et al.

It is certified that error appears in the above-identified patent and that said Letters Patent is hereby corrected as shown below:

Column 14,
Line 56, "as" should be deleted.

Column 15,
Line 22, "web" should read -- Web --.

Column 16,
Line 31, "Server/order" should read -- Server/Order --; and
Line 32, "order" should read -- An order --.

Column 17,
Line 11, "an" should read -- can --; and
Line 27, "Accounting/settlement" should read -- Accounting/Settlement --.

Column 18,
Line 43, "a" should read -- an --; and
Line 57, "an" should read -- can --.

Column 19,
Line 54, "permits" should read -- permit --.

Column 23,
Line 30, "pr" should read -- or --.

Column 24,
Line 48, "A image processing" should read -- An image processing --.

Signed and Sealed this

Eighth Day of June, 2004

JON W. DUDAS
*Acting Director of the United States Patent and Trademark Office*